US012599915B2

(12) United States Patent
Mah et al.

(10) Patent No.: US 12,599,915 B2
(45) Date of Patent: Apr. 14, 2026

(54) AUTOMATIC MAGNETIC IMPURITY SAMPLE ISOLATION

(71) Applicant: MAG IA, INC., Austin, TX (US)

(72) Inventors: Jongwook Mah, Austin, TX (US); Hoang Elliot Willis, Pflugerville, TX (US)

(73) Assignee: MAG IA, INC., Austin, TX (US)

(*) Notice: Subject to any disclaimer, the term of this patent is extended or adjusted under 35 U.S.C. 154(b) by 0 days.

(21) Appl. No.: 19/023,867

(22) Filed: Jan. 16, 2025

(65) Prior Publication Data

US 2025/0222465 A1 Jul. 10, 2025

Related U.S. Application Data

(63) Continuation-in-part of application No. PCT/US2023/076000, filed on Oct. 4, 2023.

(Continued)

(51) Int. Cl.
*B03C 1/025* (2006.01)

(52) U.S. Cl.
CPC .................................... *B03C 1/025* (2013.01)

(58) Field of Classification Search
USPC .......................................................... 210/695
See application file for complete search history.

(56) References Cited

U.S. PATENT DOCUMENTS 4,781,298 A * 11/1988 Hemstock ............... B03C 1/032 210/695
6,448,092 B1 9/2002 Tuunanen (Continued)

FOREIGN PATENT DOCUMENTS

CN 102235950 A 11/2011
CN 103243339 A 8/2013

(Continued)

OTHER PUBLICATIONS

International Search Report and Written Opinion mailed Jul. 19, 2024, issued by the European Patent Office in PCT/US2023/076000, 17 pages.

(Continued)

*Primary Examiner* — Kiet T Nguyen
(74) *Attorney, Agent, or Firm* — Definitive Patents, member Synchrony IP; Timothy D. Snowden; Yau H. Chan

(57) ABSTRACT

Apparatus and associated methods relate to separate ferromagnetic impurities from bulk battery materials. In an illustrative example, a ferromagnetic impurity separation system (FISS) may receive a sample vessel including an enclosed sample of bulk battery materials. The FISS, for example, may include a variable magnetic flux generator (e.g., an electromagnet) disposed at a position separated from the sample vessel. The FISS may also include an agitation unit having a translational motor and a rotational motor configured to rotate the sample vessel about a central axis, and to translate a position of the central axis of the sample vessel. For example, in an operation mode, the variable magnetic flux generator and the agitation unit may apply a predetermined magnetic flux, a predetermined angular velocity and a predetermined velocity to the sample vessel. Various embodiments may advantageously separate ferromagnetic impurities from the enclosed sample concisely without contaminating the sample.

21 Claims, 14 Drawing Sheets

Related U.S. Application Data

(60) Provisional application No. 63/624,184, filed on Jan. 23, 2024, provisional application No. 63/583,138, filed on Sep. 15, 2023, provisional application No. 63/520,097, filed on Aug. 17, 2023.

(56) References Cited

U.S. PATENT DOCUMENTS

| | | | | |
|---|---|---|---|---|
| 6,649,419 | B1 | 11/2003 | Anderson | |
| 8,372,341 | B2 | 2/2013 | Walsh | |
| 8,454,825 | B2 | 6/2013 | Griebel | |
| 11,293,935 | B2 | 4/2022 | Konishi | |
| 2003/0127396 | A1 | 7/2003 | Siddiqi | |
| 2010/0288705 | A1 | 11/2010 | Griebel | |
| 2011/0198294 | A1 | 8/2011 | Sharpe | |
| 2013/0256198 | A1 | 10/2013 | Ellis et al. | |
| 2016/0121341 | A1 | 5/2016 | Urick | |
| 2016/0370279 | A1 | 12/2016 | Min et al. | |
| 2018/0358156 | A1* | 12/2018 | Fujimoto | H01F 1/11 |
| 2020/0047189 | A1 | 2/2020 | MacKenzie | |
| 2020/0179942 | A1 | 6/2020 | Chang et al. | |
| 2020/0393474 | A1 | 12/2020 | Oishi et al. | |
| 2022/0251681 | A1 | 8/2022 | Rohde | |
| 2023/0234008 | A1 | 7/2023 | Hattori | |
| 2023/0241625 | A1 | 8/2023 | Jenne | |
| 2023/0283217 | A1 | 9/2023 | Naydenov | |
| 2024/0173723 | A1 | 5/2024 | Wang | |
| 2024/0293854 | A1 | 9/2024 | Guo | |
| 2024/0410847 | A1 | 12/2024 | Tahara | |

FOREIGN PATENT DOCUMENTS

| | | | |
|---|---|---|---|
| CN | 203400661 | U | 1/2014 |
| CN | 105510096 | A | 4/2016 |
| CN | 105628727 | A | 6/2016 |
| CN | 106902542 | A | 6/2017 |
| CN | 106902542 | B | 12/2018 |
| CN | 110567999 | A | 12/2019 |
| CN | 211659790 | U | 10/2020 |
| CN | 112697550 | A | 4/2021 |
| CN | 113670689 | A | 11/2021 |
| CN | 114966121 | A | 8/2022 |
| CN | 217411080 | U | 9/2022 |
| CN | 115343276 | A | 11/2022 |
| CN | 217855775 | U | 11/2022 |
| CN | 218854556 | U | 4/2023 |
| CN | 218917112 | U | 4/2023 |
| CN | 218924959 | U | 4/2023 |
| CN | 116482025 | A | 7/2023 |
| CN | 116664957 | A | 8/2023 |
| CN | 116727104 | A | 9/2023 |
| CN | 117147604 | A | 12/2023 |
| CN | 117761094 | A | 3/2024 |
| CN | 117805153 | A | 4/2024 |
| CN | 220893857 | U | 5/2024 |
| CN | 118603693 | A | 9/2024 |
| CN | 118603703 | A | 9/2024 |
| CN | 221934196 | U | 11/2024 |
| CN | 221981770 | U | 11/2024 |
| CN | 222034501 | U | 11/2024 |
| CN | 119246176 | A | 1/2025 |
| CN | 222365446 | U | 1/2025 |
| CN | 222490434 | U | 2/2025 |
| CN | 119618960 | A | 3/2025 |
| CN | 119857701 | A | 4/2025 |
| CN | 120132752 | A | 6/2025 |
| CN | 120178366 | A | 6/2025 |
| CN | 120204994 | A | 6/2025 |
| CN | 120352300 | A | 7/2025 |
| CN | 120389038 | A | 7/2025 |
| CN | 223144922 | U | 7/2025 |
| CN | 120400865 | A | 8/2025 |
| DE | 102020212466 | A1 | 4/2022 |
| EP | 2834010 | B1 | 12/2017 |
| FI | 121322 | B | 9/2010 |
| GB | 2623420 | A | 4/2024 |
| GB | 2624499 | A | 5/2024 |
| JP | H0338236 | A | 2/1991 |
| JP | H05192605 | A | 8/1993 |
| KR | 101666924 | B1 | 10/2016 |
| KR | 20160131398 | A | 11/2016 |
| KR | 1020170095597 | A | 8/2017 |
| KR | 102162083 | B1 | 10/2020 |
| KR | 102686288 | B1 | 7/2024 |
| KR | 102743834 | B1 | 12/2024 |
| KR | 2025-0014600 | A | 2/2025 |
| TW | M597180 | U | 6/2020 |
| WO | 1987005536 | A1 | 9/1987 |
| WO | 2019022347 | A1 | 1/2019 |
| WO | 2022261242 | A1 | 12/2022 |
| WO | 2022270393 | A1 | 12/2022 |
| WO | 2023123621 | A1 | 7/2023 |
| WO | 2023213839 | | 11/2023 |
| WO | 2023231156 | A1 | 12/2023 |
| WO | 2024155693 | A1 | 7/2024 |
| WO | 2025000744 | A1 | 1/2025 |
| WO | 2025026427 | A1 | 2/2025 |
| WO | 2025038122 | | 2/2025 |

OTHER PUBLICATIONS

Applicant Amendments and Remarks in response to intermediate Written Opinion in PCT/US2023/076000, filed Sep. 11, 2025, 20 pages.

Chapter II Demand Brief filed Jun. 17, 2025 in PCT/US2023/076000, 20 pages.

Elcan Industries: Magnetic Separator machine, 3 pages, Unknown date, retrieved Jan. 15, 2025.

Elcan Industries: Magnetic Separation for Dry Powders, 4 pages, Unknown date, retrieved Jan. 15, 2025.

Examiner minutes of Oral Consultation in PCT/US2023/076000, received Aug. 13, 2025, including Applicant Chapter II Demand Brief and Examiner intermediate Written Opinion for context, 36 pages.

Goudsmit Magnetics: Magnetic drums in housing—pharma type, 3 pages, Unknown date, retrieved Jan. 15, 2025.

Intermediate Written Opinion mailed Jul. 11, 2025, issued by the European Patent Office in PCT/US2023/076000, 14 pages.

International Invitation to Pay Additional Fees Accompanying Results of Partial International Search and Provisional Opinion received Apr. 25, 2025, issued by the European Patent Office in PCT/US2024/050393, 16 pages.

International Preliminary Report on Patentability completed Nov. 19, 2025, issued by the European Patent Office in PCT/US2023/076000 and including Annex of Applicant's prior remarks and amendments, 47 pages.

International Search Report and Written Opinion received Jul. 23, 2025, issued by the European Patent Office in PCT/US2024/050393, 35 pages.

Notice of Allowance dated Jul. 18, 2025 for U.S. Appl. No. 19/025,035 (pp. 1-10).

Notice of Allowance dated Sep. 19, 2025 for U.S. Appl. No. 19/025,035 (pp. 1-3).

Notice of Allowance dated Nov. 3, 2025 for U.S. Appl. No. 19/025,035 (pp. 1-3).

* cited by examiner

AUTOMATIC MAGNETIC IMPURITY SAMPLE ISOLATION

CROSS-REFERENCE TO RELATED APPLICATIONS

This application is a continuation-in-part of and claims the benefit of PCT/US2023/076000, titled "Automatic Magnetic Impurity Sample Isolation," filed by MAG IA LLC on Oct. 4, 2023, which application claims the benefit of U.S. Provisional Application Ser. No. 63/520,097, titled "High-Precision Magnetic Particle Collector," filed by Jongwook Mah, on Aug. 17, 2023, and which also claims the benefit of U.S. Provisional Application Ser. No. 63/583,138, titled "Automatic Magnetic Impurity Sample Isolation," filed by Jongwook Mah, et al., on Sep. 15, 2023.

This application also claims the benefit of U.S. Provisional Application Ser. No. 63/624,184, titled "Modular Magnetic Impurities Collection," filed by Kang Wook Shin, et al., on Jan. 23, 2024.

This application incorporates the entire contents of the foregoing application(s) herein by reference."

TECHNICAL FIELD

Various embodiments relate generally to battery manufacturing.

BACKGROUND

Energy storage devices may, for example, include batteries. Batteries may be made from various chemistries. For example, lithium-ion batteries, sometimes referred to as Li-ion batteries, may be used as portable electronic devices and electric vehicles due to their high energy density, rechargeability, and lightweight characteristics. Batteries, for example, may power smartphones, laptops, electric cars, and/or a wide range of other applications.

Batteries may, for example, include three components: a cathode, an anode, and an electrolyte. As an illustrative example, in a Li-on battery, the cathode, for example, may include a lithium-based compound, the anode may include graphite, and the electrolyte may include a lithium salt dissolved in a solvent. During charging, for example, lithium ions may move from the cathode to the anode through the electrolyte. For example, during discharge, the lithium ions flow back to the cathode, releasing electrical energy to power various devices. Various cathode materials may be used in a Lithium battery, including lithium cobalt oxide ($LiCoO2$), lithium iron phosphate ($LiFePO4$), lithium manganese oxide ($LiMn2O4$), and/or lithium nickel cobalt manganese oxide ($Li(NiCoMn)O2$).

Magnetic impurities (e.g., Iron, Cobalt, Nickel, Manganese, Copper, Chromium, Zinc, Lead) may be present in Li-ion battery cathode materials. Manufacturers may wish to reduce magnetic impurities from battery materials (e.g., Li-ion cathode materials).

SUMMARY

Apparatus and associated methods relate to separating ferromagnetic impurities from bulk battery materials. In an illustrative example, a ferromagnetic impurity separation system (FISS) may receive a sample vessel including an enclosed sample of bulk battery materials. The FISS, for example, may include a variable magnetic flux generator (e.g., an electromagnet) disposed at a position separated from the sample vessel. The FISS may also include an agitation unit having a translational motor and a rotational motor configured to rotate the sample vessel about a central axis, and to translate a position of the central axis of the sample vessel in one or more axes. For example, in an operation mode, the variable magnetic flux generator and the agitation unit may apply a predetermined magnetic flux, a predetermined angular velocity and a predetermined velocity to the sample vessel. Various embodiments may advantageously separate ferromagnetic impurities from the enclosed sample concisely without contaminating the sample.

Various embodiments may achieve one or more advantages. For example, some embodiments may apply progressively lower magnetic flux and kinetic energy to the sample vessel to advantageously remove paramagnetic impurities. Some embodiments may, for example, apply an acid to rinse the ferromagnetic impurities from the sample vessel to advantageously be prepared for inductively coupled plasma (ICP) analysis. Some embodiments may, for example, apply ultrapure water to rinse the ferromagnetic impurities from the sample vessel to advantageously be prepared for optical analysis. For example, some embodiments may advantageously provide inline impurity monitoring. Some embodiments may, for example, advantageously supply magnetic flux to the sample vessel up to 15000 Gauss.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a ferromagnetic impurities separation system (FISS) is introduced with reference to FIGS. 1-2. Second, that introduction leads into a description with reference to FIGS. 3A-F of some exemplary embodiments of the FISS. Third, with reference to FIGS. 4A-6, inline sampling devices are described in application to exemplary inline magnetic impurity analysis systems. Fourth, with reference to FIGS. 7A-8, the discussion turns to exemplary embodiments that illustrate systems and methods for using voltammetry analysis to determine a magnetic impurity metric of a batch of bulk battery materials. Fifth, and with reference to FIG. 9-11, this document describes exemplary apparatus and methods useful for separating and measuring ferromagnetic impurities in a battery production system. Finally, the document discusses further embodiments, exemplary applications and aspects relating to ferromagnetic impurity monitoring and measuring systems for battery production.

Figure 1:
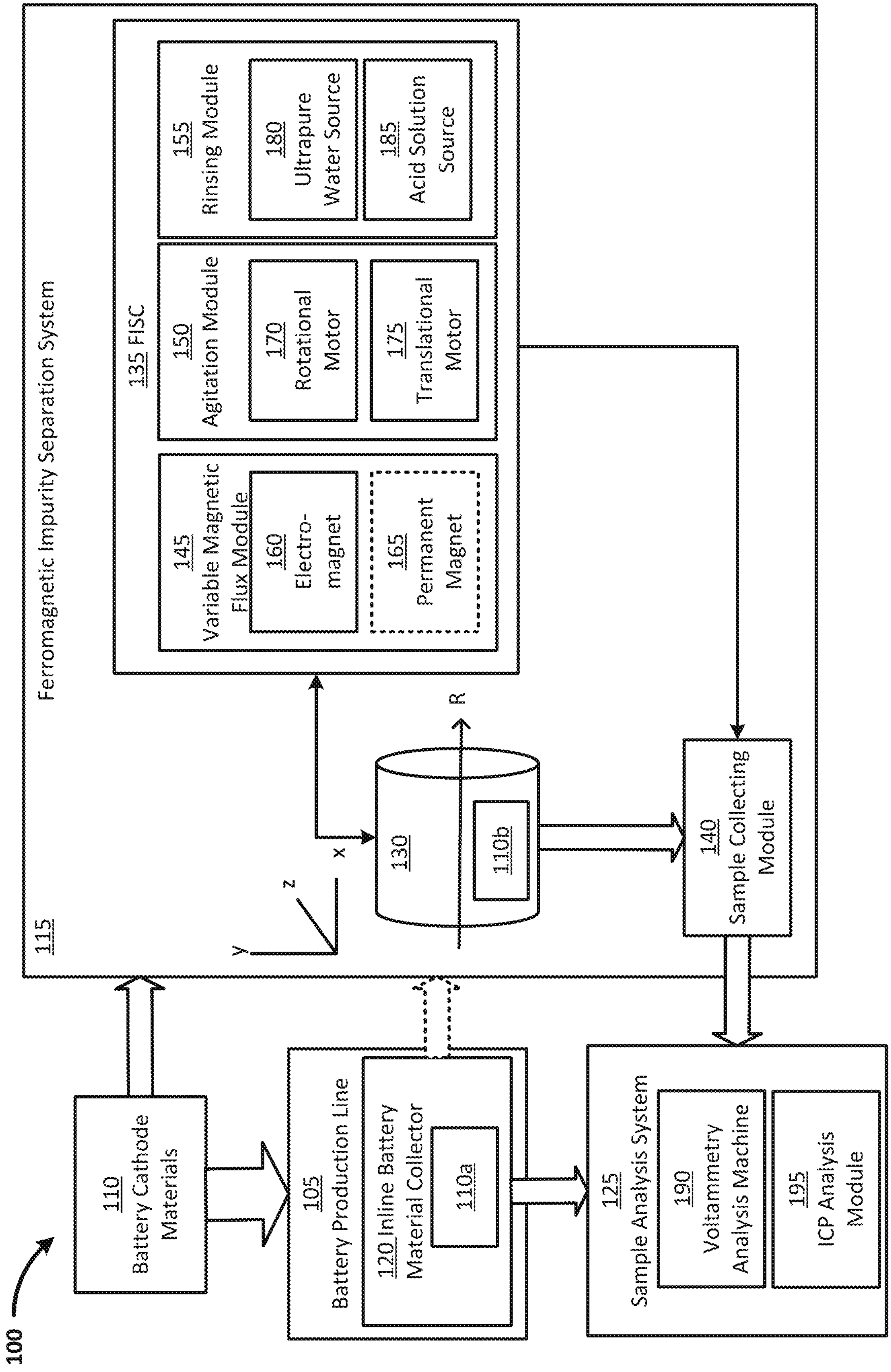
FIG. 1 depicts an exemplary battery production system (BPS) employed in an illustrative use-case scenario.

FIG. 1 depicts an exemplary battery production system (BPS) employed in an illustrative use-case scenario. In this example, a BPS 100 includes a battery production line 105. For example, the battery production line 105 may be a production line for Lithium ion batteries. For example, the battery production line 105 may be a production line for a nickel-cadmium battery. For example, the battery production line 105 may be a production line for solid state batteries. For example, the battery production line 105 may be a production line for lead-acid batteries. For example, the battery production line 105 may be a production line for other solid-state batteries. For example, the battery production line 105 may include facilities for manufacturing electrodes for a battery.

In this example, the battery production line 105 receives a battery cathode material (BCM 110). For example, the battery production line 105 may use the BCM 110 to produce an electrode for batteries. In some implementations, the BCM 110 may be in a powder form (e.g., comes in bulk in crates of cathodes powder). For example, the BCM 110 may include a lithium nickel manganese cobalt oxide (NMC) cathode powder. In other examples, the BCM 110 may include Lithium powder (e.g., Lithium Nickel Cobalt Manganese Oxide (NCM), Lithium Nickel Cobalt Aluminum Oxide (NCA), Lithium Cobalt Oxide (LiCoO2), Lithium Manganese Oxide (LiMn2O4), Lithium Iron Phosphate (LiFePO4)). In some implementations, the BCM 110 may include precursor cathode materials (e.g., Ni powder, LiOH, Iron oxide).

In some examples, the BCM 110 may include magnetic impurities (e.g., Zinc, Chromium, Iron, Nickel) depending on a type of cathode materials used in the battery production line 105. In some examples, the battery production line 105 may be contaminated by magnetic impurities. For example, the magnetic impurities may adversely affect quality (e.g., safety, longevity, performance) of batteries produced by the battery production line 105. Magnetic impurities may, for example, trap lithium ions, making them unavailable for electrochemical reactions. For example, the magnetic impurities may increase the internal resistance of the battery, thereby reducing the amount of power that can be delivered. For example, the magnetic impurities may accelerate the degradation of the cathode material. For example, the magnetic impurities may increase the risk of thermal runaway causing the battery to overheat. For example, an adversely affected battery may have a higher risk of being overheated when a concentration of magnetic impurities is higher than an acceptable threshold. For example, the adversely affected battery may have a higher risk of not performing according to specification (e.g., lower power output, longer charging time, lower storage capacity). In various examples, during production if the BCM 110 was discovered to include magnetic impurities higher than the acceptable threshold, the battery production line 105 may have to be stopped urgently such that defective cathode materials are cleaned out before resuming production. In such an event, for example, an operator of the battery production line 105 may incur high cost and serious production delays.

The BPS 100 includes a ferromagnetic impurity separation system (FISS 115). In some implementations, the FISS 115 may separate magnetic (ferromagnetic) impurities from the BCM 110. For example, the FISS 115 may precisely separate ferromagnetic impurities from the BCM 110 by separating the ferromagnetic impurities from paramagnetic impurities in the BCM 110. The separated magnetic impurities may, for example, be analyzed in a sample analysis system 125. In some examples, the separated impurities may be transferred to another magnetic impurities analysis facility. For example, accordingly, the BCM 110 may advantageously be verified to be acceptable for production before being used in the battery production line 105.

In some examples, by way of example and not limitation, the FISS 115 may be operated in a lab setting. For example, bulk cathode material powders may be sampled (e.g., by obtaining a predetermined sample size) and the sample be taken to the FISS 115. The FISS 115 may isolate target magnetic impurities (e.g., ferromagnetic impurities). For example, the FISS 115 may be used to determine a quality (e.g., purity level) of bulk material prior to the bulk material being permitted to enter the production line. For example, if the bulk material exceeds a maximum magnetic impurity threshold, the bulk material may be rejected or cleaned prior to entering the facility.

In this example, the battery production line 105 may include an inline battery material collector (IBMC 120). For example, the IBMC 120 may from time to time (e.g., periodically, continuously) sample the BCM 110 used in the battery production line 105 to verify a quality of the BCM 110. In this example, the IBMC 120 may transfer a sampled BCM 110*a* to the sample analysis system 125. For example, the sample analysis system 125 may determine a concentration of targeted (ferro)magnetic impurities in the BCM 110.

Optionally, as shown in FIG. 1, the IBMC 120 may transfer the sampled BCM 110*a* to the FISS 115. For example, the BPS 100 may use the FISS 115 to advantageously separate ferromagnetic impurities from the sampled BCM 110*a* before analyzing the ferromagnetic impurities in the sample analysis system 125. For example, an analysis result using the ferromagnetic impurities from the FISS 115 may be more accurate. Various implementations of the IBMC 120 are described in further detail with reference to FIGS. 4A-6.

The FISS 115 includes a sample vessel 130, a ferromagnetic impurity separation controller (FISC 135), and a sample collecting module 140. In some embodiments, the sample vessel 130 may include a cavity configured to receive (e.g., manually load, automatically receive from the IBMC 120) a BCM sample 110*b* (e.g., the sampled BCM 110*a*, sampled directly from the BCM 110 before production).

The sample vessel 130 is connected to the FISC 135 in this example. The FISC 135 includes a variable magnetic flux module 145, an agitation module 150, and a rinsing module 155. For example, the variable magnetic flux module 145 may generate a varying magnetic flux (e.g., 1,200-20,000 Gauss) in the sample vessel 130. In some implementations, the variable magnetic flux module 145 may be positioned outside of the sample vessel 130 such that the BCM sample 110*b* may be physically separated from the variable magnetic flux module 145. In some examples, the separation between the variable magnetic flux module 145 and the BCM sample 110*b* may advantageously prevent the BCM sample 110*b* from being contaminated by the variable magnetic flux generated by the variable magnetic flux module 145.

As shown, the variable magnetic flux module 145 includes an electromagnet 160. For example, the FISC 135 may control the electromagnet 160 to generate a selected magnetic flux using a control signal. For example, an impurity separation process may include a multi-cycle (2 cycles, 3 cycles, 6 cycles, . . . , N cycles) separation process. For example, the variable magnetic flux module 145 may apply different strengths of magnetic flux to the sample vessel 130 in each separation cycle. For example, by applying multiple strengths of magnetic flux to the sample vessel 130, the FISS 115 may separate paramagnetic and ferromagnetic particles from the BCM sample 110*b*.

In some implementations, the variable magnetic flux module 145 may also include a permanent magnet 165. For example, the variable magnetic flux module 145 may be controlled to use both the electromagnet 160 and the permanent magnet 165 to generate a selected magnetic flux in the sample vessel 130. In some implementations, the FISC 135 may be configured to generate magnetic flux below 10,000 Gauss using only the permanent magnet 165. For example, for magnetic flux ranges above 10,000 Gauss, the FISC 135 may use both the electromagnet 160 and the permanent magnet 165. In some implementations, the FISC 135 may be configured to generate high magnetic flux (e.g., above 6000 Gauss). In some implementations, the variable magnetic flux module 145 may vary magnetic strength of the permanent magnet 165. For example, the variable magnetic flux module 145 may control a distance between the permanent magnet 165 and the sample vessel 130 to advantageously vary the magnetic flux within the sample vessel 130 in different cycles of the impurity separation process.

The agitation module 150, for example, may agitate the BCM sample 110*b* during the impurity separation process. For example, the FISC 135 may control the agitation module 150 to agitate the sample vessel 130 (e.g., rotated, shaken side-to-side, shaken up and down) during application of magnetic flux by the variable magnetic flux module 145. As shown, the agitation module 150 includes a rotational motor 170 and a translational motor 175. For example, the rotational motor 170 and the translational motor 175 may include an AC motor. For example, the rotational motor 170 and the translational motor 175 may include a DC motor. For example, the rotational motor 170 and the translational motor 175 may include a step motor. For example, the rotational motor 170 and the translational motor 175 may include a servo motor. For example, the rotational motor 170 and the translational motor 175 may include a pneumatic motor. For example, the rotational motor 170 and the translational motor 175 may include a hydraulic motor.

As shown in this example, the rotational motor 170 may rotate the sample vessel 130 along a rotational axis R. For example, the translational motor 175 may translate the sample vessel 130 in the Euclidean space along one or more of the x, y, and z (3) axes. In some examples, the agitation module 150 may, for example, advantageously break up clumping of magnetic impurities and allow more accurate separation and detection of magnetic impurities in the BCM sample 110*b*.

The rinsing module 155 includes an ultrapure water source 180 and an acid solution source 185. In some implementations, the FISC 135 may rinse the sample vessel 130 between each cycle of the impurity separation process to dump unwanted particles (e.g., paramagnetic impurities) from the sample vessel 130. As an illustrative example without limitation, at an end of each cycle, magnetic impurities may be separated from the BCM sample 110*b* at a wall of the sample vessel 130. For example, the FISC 135 may then apply a lower magnetic flux to the sample vessel 130 to reduce attaching strengths between the paramagnetic impurities and the wall. Rinsing the wall at this time with ultrapure water may, for example, flush out the paramagnetic impurities from the sample vessel 130. In some implementations, the remaining material may then be subjected to progressively lower magnetic fluxes in a next cycle, while the paramagnetic impurities are progressively washed away (e.g., using ultrapure water) in each subsequent cycle.

Once a lowest magnetic flux is reached, in some implementations, the variable magnetic source may be operated off to have substantially no magnetic flux. For example, the sample collecting module 140 may collect remaining particles (e.g., using ultrapure water, using acid flush) from the sample vessel 130. For example, the sample collecting module 140 may operate together with the acid solution source 185 to collect the remaining particles using an acid solution. For example, collecting the remaining particles with an acidic solution may advantageously facilitate analysis of the remaining particles using an inductively coupled plasma (ICP) analysis. In some implementations, when a final solution collected with the acidic solution may include various types of impurities. In another example, the sample vessel may be washed with ultrapure water to produce a partial sample (e.g., without the acidic solution) for optical or spectroscopic methods (SEM, XRF) to physically look at the sample and their shape and composition.

For example, the collected particles may include mostly ferromagnetic magnetic impurities. As shown, the collected particles may be transferred to the sample analysis system 125 to be analyzed. For example, the sample analysis system 125 may determine presence and/or concentration of magnetic impurities in the BCM 110. In some embodiments, the sample analysis system 125 may be configured to identify and detect target magnetic impurities.

In this example, the sample analysis system 125 includes a voltammetry analysis module 190 and an ICP analysis module 195. For example, the voltammetry analysis module 190 may apply anodic stripping voltammetry to determine a presence of target magnetic impurities in the purified sample. Various embodiments of using the voltammetry analysis module 190 to analyze a sample of the BCM 110 are further described with reference to FIGS. 7A-B and 10. In various embodiments, the sample analysis system 125 may determine the collected particles using optical (e.g., scanning electron microscopy), spectroscopic (e.g., X-ray fluorescence, X-ray diffraction), and/or elemental (e.g., ICP) analysis.

In some embodiments, the FISS 115 may advantageously allow detection of magnetic impurities in the BCM 110. For example, some embodiments may advantageously prevent contamination of a manufacturing line with impure battery material. Some embodiments may advantageously reduce the incidence of battery fires and/or battery failure due to the presence of magnetic impurities.

In various implementations, a method for separating ferromagnetic impurities from bulk battery material (e.g., the BCM 110) may include agitating a sample of the bulk battery material (e.g., the BCM sample 110*b*) in an enclosed container (e.g., the sample vessel 130) by inducing kinetic energy in a rotational axis (e.g., using the rotational motor 170) and a translational axis (e.g., using the translational motor 175), and (e.g., simultaneously) applying a time-varying magnetic flux (e.g., using the variable magnetic flux module 145) to the sample.

For example, the method may also include applying a sequence of phases (e.g., the N cycle of impurity separation process) with decreasing magnetic flux and correspondingly decreasing rotational speed such that paramagnetic particles are separated from ferromagnetic impurities. For example, the method may further include collecting ferromagnetic impurities separated from the sample by rinsing the enclosed container with ultrapure water (e.g., using the ultrapure water source 180) and/or with acid (e.g., using the acid solution source 185). In some examples, the method may include analyzing the ferromagnetic impurities using an ICP mass spectrometry analysis.

Accordingly, various embodiments may advantageously generate a metric (e.g., concentration, level, presence) of ferromagnetic impurities in a battery material to be used in the battery production line 105. Using the IBMC 120, some embodiments may provide near-realtime, in-line detection of magnetic impurities in the BCM 110. For example, the battery production line 105 may include an in-line detector by combining the IBMC 120, the FISS 115, and/or the sample analysis system 125. The in-line detector may automatically generate a metric representing a quality of the BCM 110 without contaminating the BCM 110 with a direct contact of liquid and/or a permanent magnet.

Figure 2:
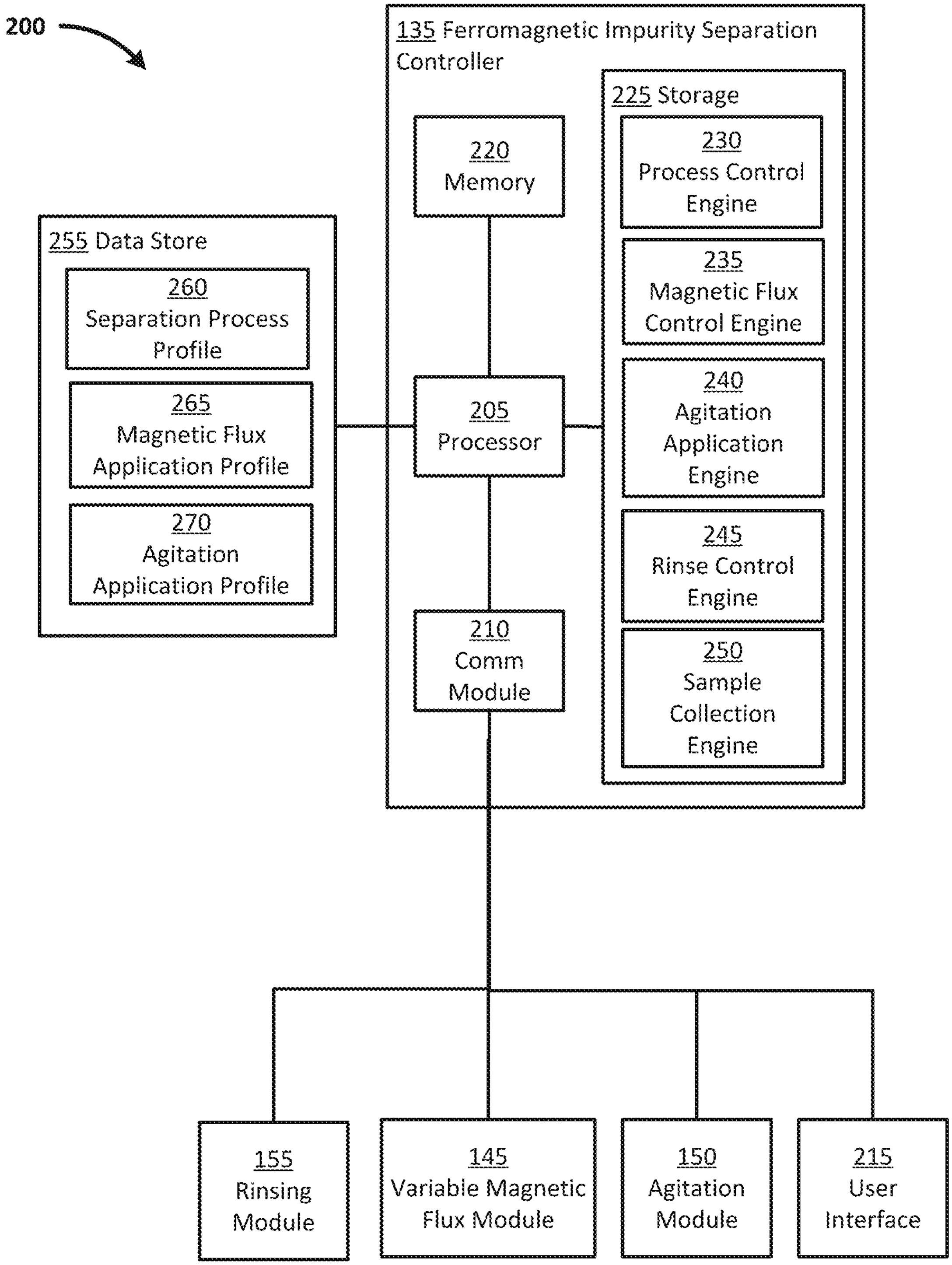
FIG. 2 is a block diagram depicting an exemplary ferromagnetic impurity separation system (FISS).

FIG. 2 is a block diagram depicting an exemplary ferromagnetic impurity separation system (FISS). In this example, a FISS 200 includes the FISC 135 (FIG. 1). The FISC 135 includes a processor 205. The processor 205 may, for example, include one or more processing units. The processor 205 is operably coupled to a communication module 210. The communication module 210 may, for example, include wired communication. The communication module 210 may, for example, include wireless communication. In the depicted example, the communication module 210 is operably coupled to the variable magnetic flux module 145, the agitation module 150, the rinsing module 155, and a user interface 215. For example, the user interface 215 may receive control signals from a user. For example, the control signals may include a signal to begin the impurity separation process. For example, the control signals may include identification of a selected list of target magnetic impurities. For example, the control signals may include input of an amount (e.g., weight, volume) of the BCM sample 110*b* in the sample vessel 130. For example, the control signals may include a type of the BCM 110.

The user interface 215 may also include a display for the user. For example, the user interface 215 may display an analysis result (e.g., the metric generated by the sample analysis system 125, a presence of each of the target impurities). For example, the user interface 215 may display warnings and/or other system messages to the user. For example, the user interface 215 may display a process status of the FISS 115 to the user.

The processor 205 is operably coupled to a memory module 220. The memory module 220 may, for example, include one or more memory modules (e.g., random-access memory (RAM)). The processor 205 includes a storage module 225. The storage module 225 may, for example, include one or more storage modules (e.g., non-volatile memory). In the depicted example, the storage module 225 includes a process control engine 230, a magnetic flux control engine 235, an agitation application engine 240, a rinse control engine 245, and a sample collection engine 250.

The process control engine 230, for example, may determine a separation process to be performed in the FISC 135. For example, the process control engine 230 may determine a number of cycles to be performed in the impurity separation process. For example, the process control engine 230 may determine, in each cycle, a magnetic flux and a kinetic energy to be applied to the sample vessel 130 based on a type of the BCM 110 and/or target impurities to be analyzed in the BCM 110.

As shown, the processor 205 is further coupled to a data store 255. The data store 255 includes a separation process profile 260. For example, the process control engine 230 may, upon receiving a signal to begin the impurity separation process in the sample vessel 130, retrieve the separation process profile 260 to determine parameters of the impurity separation process. For example, the separation process profile 260 may include a number of cycles in the impurity separation process. For example, the separation process profile 260 may include a duration of each step in each cycle of the impurity separation process. For example, the separation process profile 260 may include time-varying profile of magnetic flux and kinetic energy to be applied to the sample vessel 130 in each cycle of the impurity separation process.

The magnetic flux control engine 235, for example, may control the variable magnetic flux module 145. For example, the magnetic flux control engine 235 may transmit control signals to the electromagnet 160 and the permanent magnet 165 to regulate a magnetic flux within the sample vessel 130. For example, the magnetic flux control engine 235 may generate the control signals based on a magnetic flux application profile 265 in the data store 255. In some implementations, the magnetic flux application profile 265 may include, as a function of a required magnetic strength, a combination of control signals to the electromagnet 160 and the permanent magnet 165 to generate the required magnetic strength.

The agitation application engine 240, for example, may control the agitation module 150. For example, the agitation application engine 240 may transmit control signals to the rotational motor 170 and the translational motor 175 to regulate a kinetic energy applied to the sample vessel 130. For example, the agitation application engine 240 may generate the control signals based on an agitation application profile 270 in the data store 255. In some implementations, the agitation application profile 270 may include, as a function of a required kinetic energy (e.g., specified in the separation process profile 260), a combination of control signals to the rotational motor 170 (e.g., to generate an angular velocity ($\omega$) of the sample vessel 130) and the translational motor 175 (e.g., to generate a velocity (v) of the sample vessel 130) to generate the required kinetic energy.

As an illustrative example without limitation, the process control engine 230 may determine, from the separation process profile 260, that the impurity separation process includes N cycles. For example, the process control engine 230 may select the separation process profile 260 based on target impurities and a type of the BCM 110. For each of the N cycles, the separation process profile 260 may specify a magnetic flux and kinetic energy to be applied to the sample vessel 130 at various times in the cycle.

Based on the separation process profile 260, the process control engine 230 may use the magnetic flux control engine 235 and the agitation application engine 240 to generate the specified magnetic flux and kinetic energy to the sample vessel 130 at specified times. For example, the separation process profile 260 may specify that, at i-th cycle, the variable magnetic flux module 145 and the agitation module 150 to apply an i-th predetermined magnetic flux ($\Phi_i$), an i-th predetermined angular velocity ($\omega_i$) and an i-th predetermined velocity ($v_i$) to the sample vessel 130 for a predetermined separation time (e.g., 2 seconds, 10 seconds, 30 seconds, 60 seconds).

After the predetermined separation time, in each cycle, for example, the separation process profile 260 may include a rinsing cycle. For example, the process control engine 230 may activate the rinse control engine 245 in the rinsing cycle to use ultrapure water to rinse out paramagnetic impurities.

In some implementations, the separation process profile 260 may also include a rinsing magnetic flux to be applied to the sample vessel 130 in the rinsing cycle. For example, in the i-th cycle, the separation process profile 260 may include application of an i-th rinsing magnetic flux ($\Phi\_ri$) to the sample vessel 130. In some embodiments, $\Phi\_ri<\Phi\_i$ to advantageously separate paramagnetic impurities from the ferromagnetic impurities.

In various implementations, the separation process profile 260 may include magnetic fluxes ($\Phi_1, \Phi_2, \ldots \Phi_N$) applied in subsequent cycles $i=1, 2, \ldots, N$ to be monotonically diminishing, such that $\Phi_1>\Phi_2> \ldots >\Phi_N$. For example, accordingly, the paramagnetic impurities are gradually removed from each subsequent separation cycle. In some implementations, the separation process profile 260 may also include kinetic energy ($KE\_1, KE\_2, \ldots KE\_N$) corresponding to a predetermined angular velocity ($\omega_i$) and a predetermined velocity ($v_i$) of each separation cycle $i=1, 2, \ldots, N$ to be monotonically diminishing.

After N separation cycles, for example, the separation process profile 260 may include a sample collection cycle. For example, the sample collection engine 250 may control the variable magnetic flux module 145, the agitation module 150, the rinsing module 155 together with the sample collecting module 140 to collect remaining particles from the sample vessel 130.

In various implementations, in the sample collection cycle, the rotational motor 170 may be controlled to spin the sample vessel 130 at a low speed. For example, the translational motor 175 may be controlled to be in a collection position after spinning of the sample vessel 130 is completed. Some exemplary sample collection processes are described with reference to FIG. 3F.

Figure 3A:
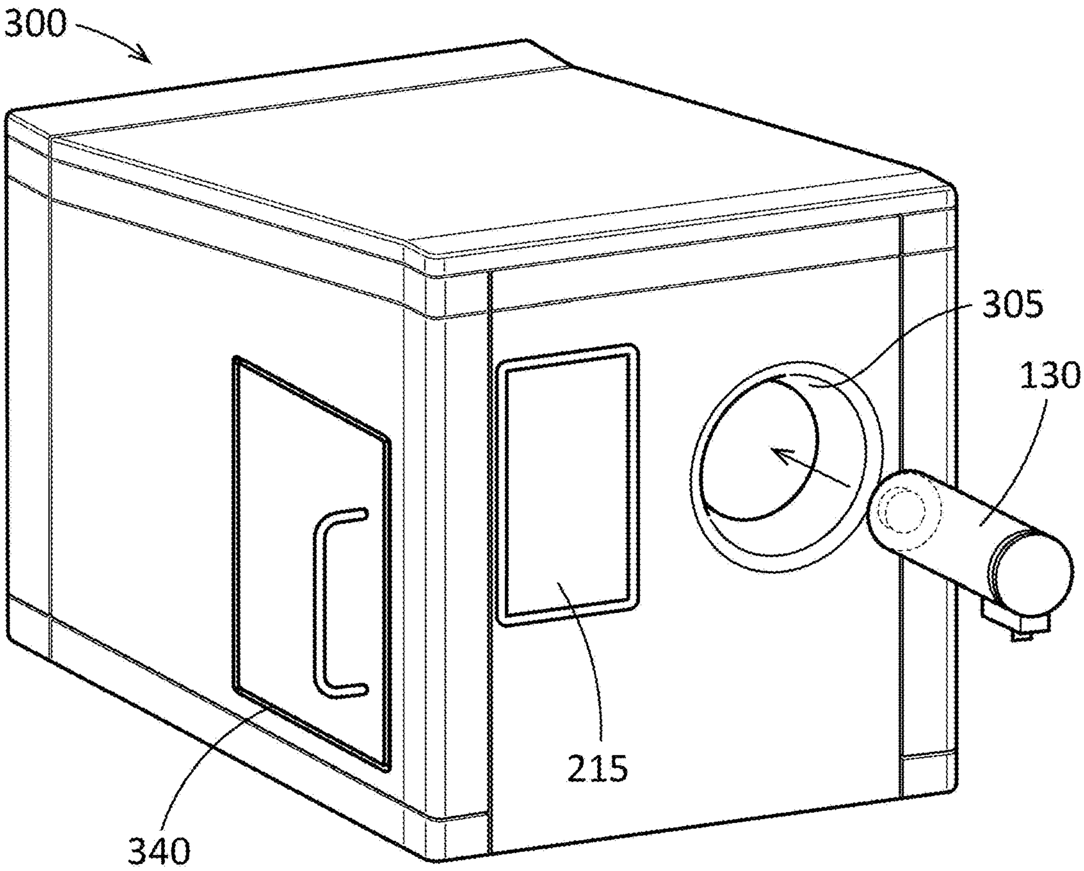
FIG. 3A, FIG. 3B, FIG. 3C, FIG. 3D, FIG. 3E, and FIG. 3F depict an exemplary ferromagnetic impurity separator system.

FIG. 3A, FIG. 3B, FIG. 3C, FIG. 3D, FIG. 3E, and FIG. 3F depict an exemplary ferromagnetic impurity separator system. As shown in FIG. 3A, a FISS 300 may include an aperture 305. For example, the sample vessel 130 enclosing the BCM sample 110*b* (e.g., in a powder form) may be inserted into the FISS 300 for the impurity separation process through the aperture 305. In this example, a user may use the user interface 215 to control the FISS 300. For example, the user may input a weight of the BCM sample 110*b* in the sample vessel 130. For example, the user may input target impurities to be separated from the BCM sample 110*b* in the sample vessel 130.

Figure 3B:
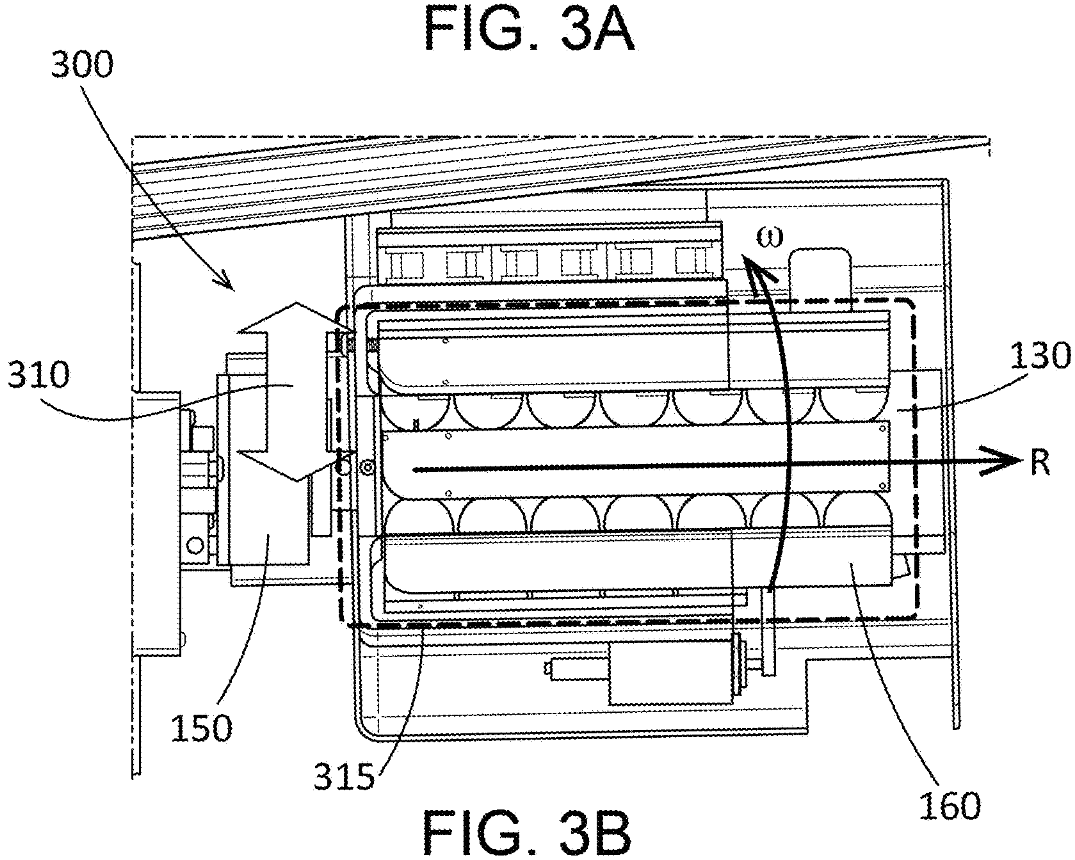

FIG. 3B shows a transparent diagram of the FISS 300. As shown, the sample vessel 130 is (releasably) coupled to the agitation module 150 and the electromagnet 160. As shown, the electromagnet 160 is disposed outside of the sample vessel 130 such that the BCM sample 110*b* may be physically separated from the electromagnet 160.

The agitation module 150 may agitate the sample vessel 130. For example, the vessel may be agitated (e.g., rotated about a central axis R, shaken side-to-side, shaken up and down along a translational axis 310) during application of the current magnetic flux by the variable magnetic source. Agitation may, for example, advantageously break up clumping of magnetic impurities and allow more accurate separation and detection of magnetic impurities in the sample vessel 130.

In one embodiment, the electromagnet 160 may be controlled to provide a first magnetic flux to separate paramagnetic and ferromagnetic particles (e.g., from the BCM sample 110*b*). For example, the first magnetic flux may include a high magnetic strength. At the same time, for example, the agitation module 150 may apply a high rate or spin to the sample vessel 130. For example, all magnetic impurities (e.g., paramagnetic particles, ferromagnetic particles) may be separated from the BCM sample 110*b*. In some implementations, the sample vessel may undergo multiple separation cycles. Upon completion of each separation cycle, the sample vessel 130 may then be subjected to progressively a lower magnetic flux and/or lower spin speed. For example, the FISS 300 may induce kinetic energy in two axes (e.g., a rotational axis and a translational axis) to advantageously maximize extraction potential of the sample.

As shown, the FISS 300 includes more than one electromagnet 160 to form an electromagnetic sleeve 315. In some examples, the electromagnetic sleeve 315 may pulsate at different harmonization relative to the sample vessel 130 to fully extract ferromagnetic impurities from other particles.

Figure 3C:
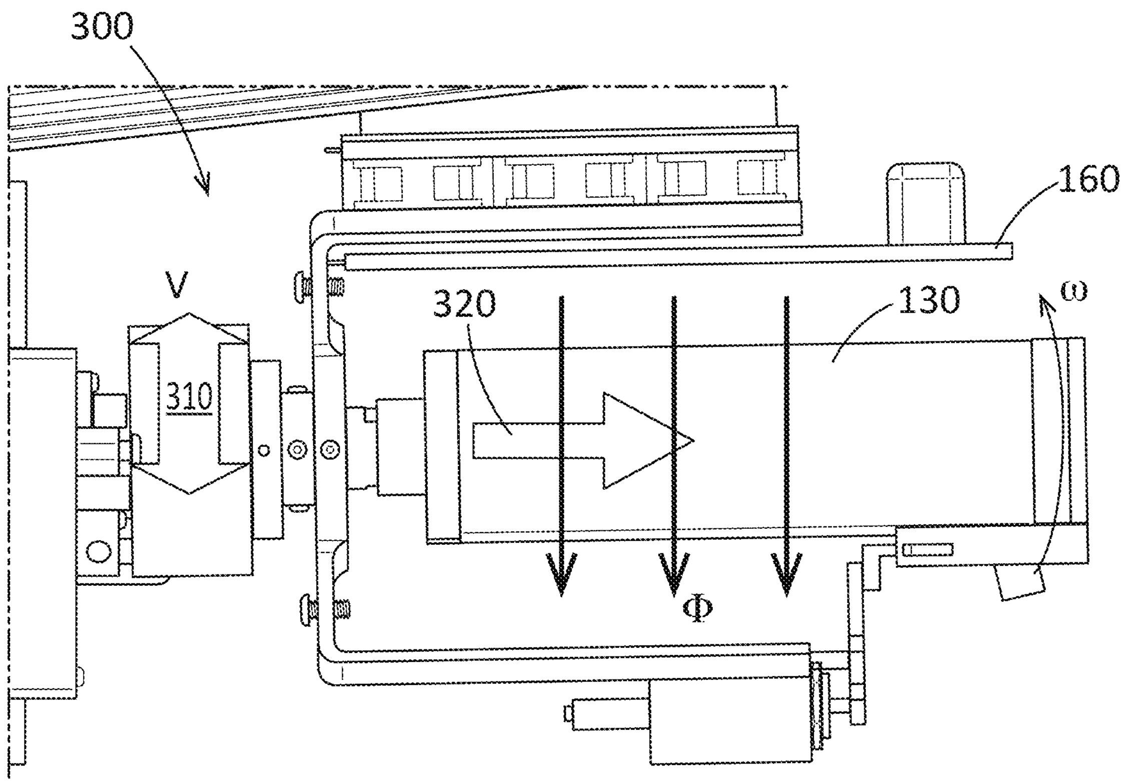

FIG. 3C shows an exemplary separation cycle (e.g., i-th cycle in the N cycle as described in FIG. 2) in an impurity separation process in the FISS 300. As shown with an arrow, the sample vessel 130 is filled with a fluid 320 (e.g., ultrapure water) in the separation cycle. In this example, the FISS 300 may apply (e.g., simultaneously) a magnetic flux $\Phi$, a translational velocity v, and an angular velocity $\omega$ to the sample vessel 130. For example, the FISS 300 may apply the magnetic flux $\Phi$, the translational velocity v, and the angular velocity $\omega$ based on the separation process profile 260. For example, magnetic impurities in the BCM sample 110*b* dissolved and/or mixed in the fluid 320 may be attracted towards an outer wall of the sample vessel 130.

Figure 3D:
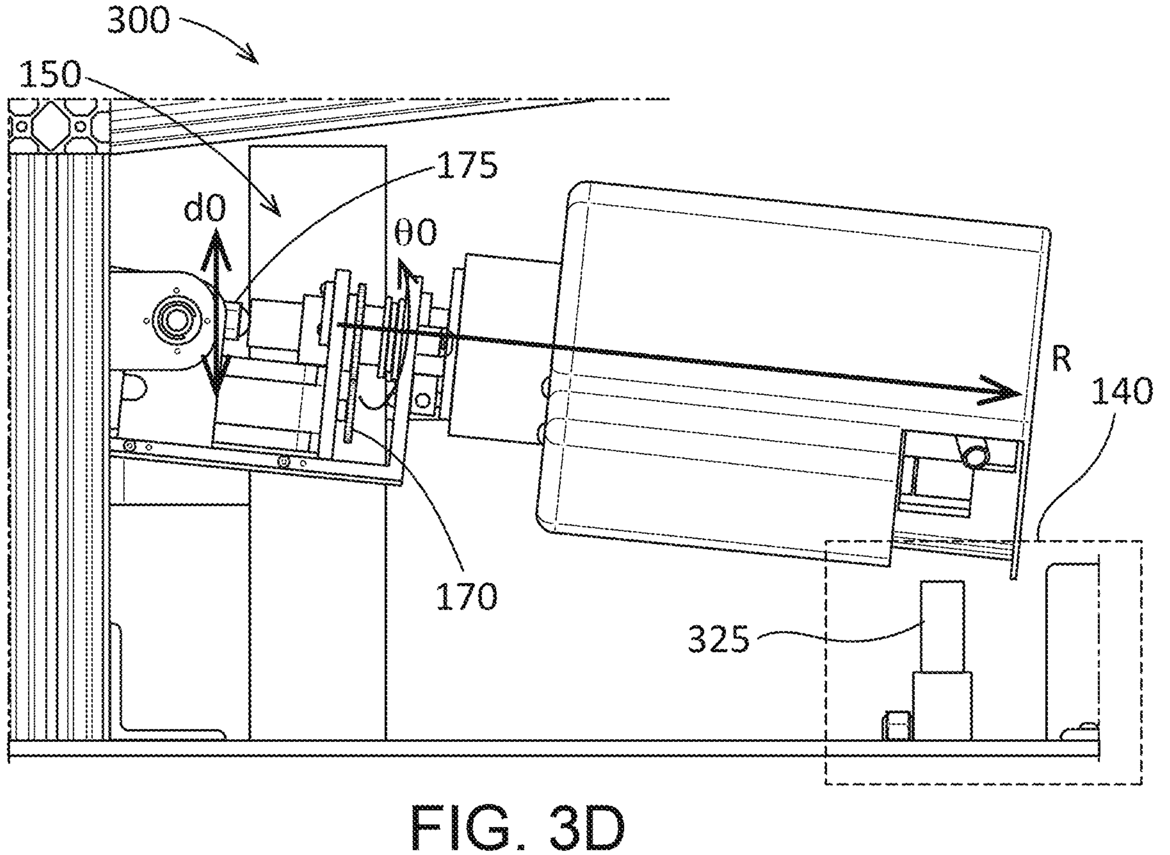

After each separation cycle, for example, the FISS 300 may perform a rinse cycle to remove unwanted particles from the sample vessel 130. As shown in FIG. 3D, in the rinse cycle, the rinse control engine 245 may control the agitation module 150 to place the sample vessel 130 at a predetermined displacement $d_0$ and a predetermined angle $\theta_0$ using the rotational motor 170 and the translational motor 175. For example, at $d_0$ and $\theta_0$, an output port of the sample vessel 130 may align with a waste collection vessel 325 of the sample collecting module 140.

Figure 3E:
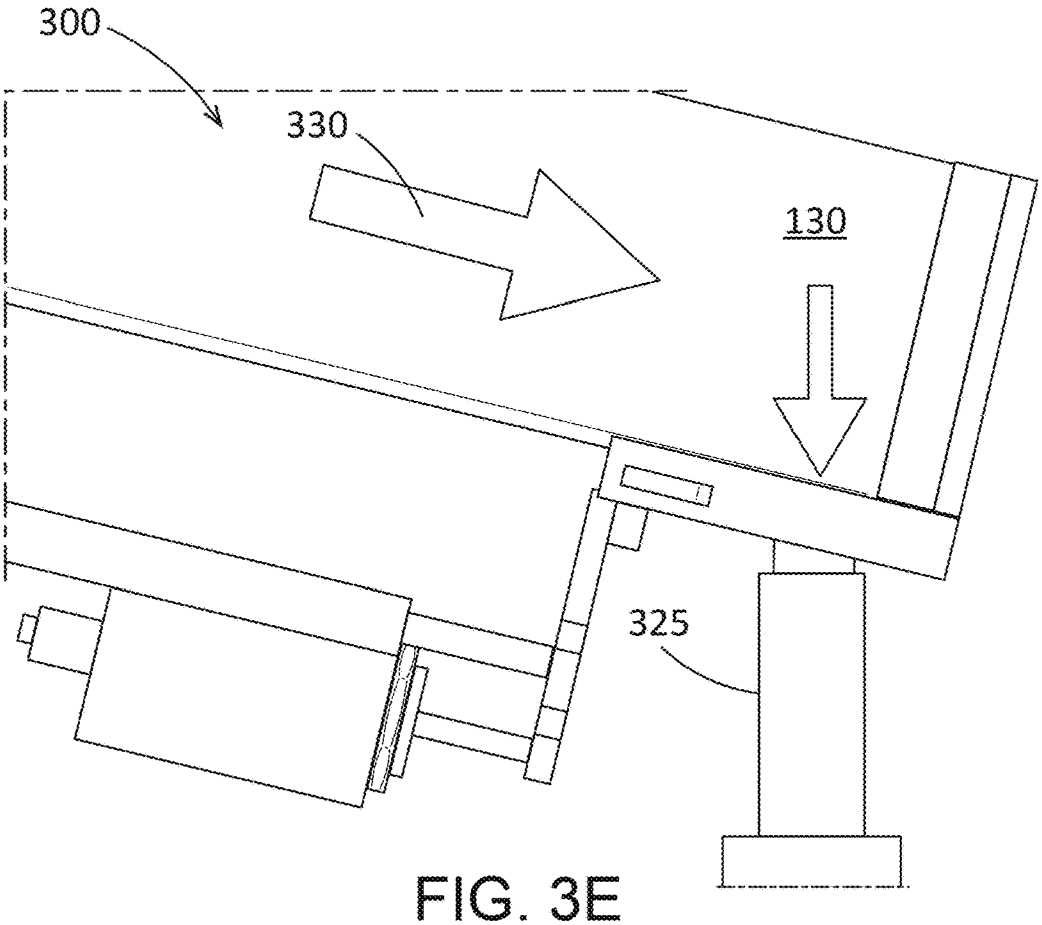

In some embodiments, the rinse control engine 245 may control the variable magnetic flux module 145 to apply a medium magnetic strength and the agitation module 150 to apply a low rate of spin to the sample vessel in the rinse cycle before the sample vessel 130 reach the position of ($d_0$, $\theta_0$). In various implementations, the rinse cycle of each subsequent separation cycle may include a different combination of magnetic strength and spin speed to advantageously extract the unwanted impurities efficiently. As shown in FIG. 3E, when the sample vessel 130 reaches the predetermined position ($d_0$, $\theta_0$), the FISS 300 may rinse the sample vessel 130 using a rinsing fluid 330 (e.g., ultrapure water) to facilitate collection of the unwanted particle in the waste collection vessel 325.

Figure 3F:
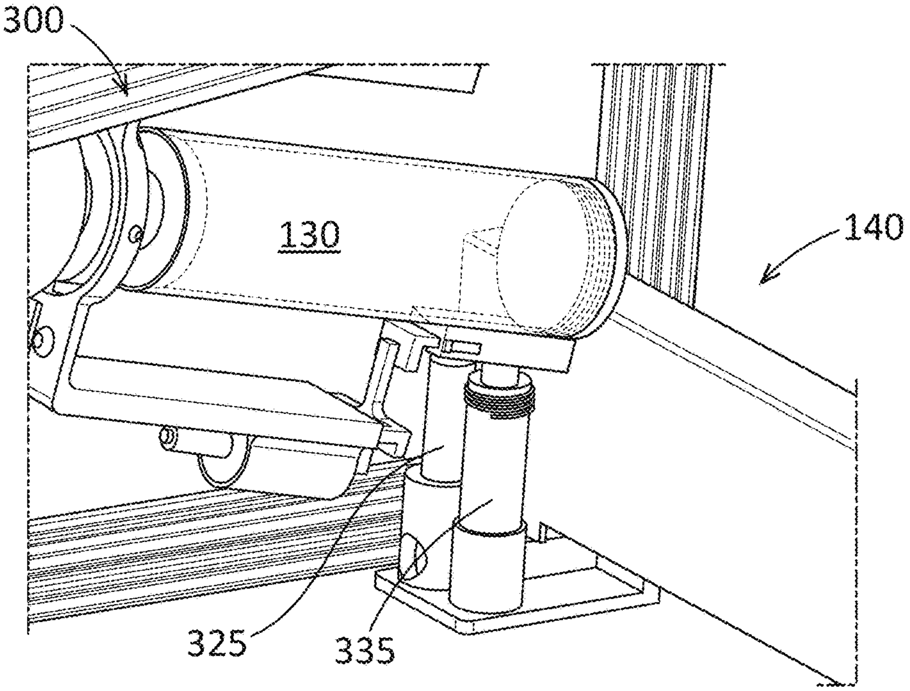

After all (e.g., N) separation cycles are completed, for example, separated magnetic impurities (e.g., ferromagnetic magnetic impurities) may also be collected as shown in FIG. 3F. In this example, the sample collecting module 140 may include a sample collection container 335. For example, the sample collection container 335 may be a 50 ml sterilized tube. For example, after a sample is collected in the sample collection container 335, a user may use a side door 340 (as shown in FIG. 3A) to collect the sample collection container 335 (e.g., for further analysis of the impurities). For example, a user may transport magnetic impurities collected in the sample collection container 335 for analysis (e.g., in the sample analysis system 125). For example, the magnetic impurities may be analyzed to determine concentrations of magnetic impurities in the BCM 110. Some embodiments may advantageously prevent contamination of a manufacturing line. Some embodiments may advantageously reduce the incidence of battery fires and/or battery failure due to the presence of magnetic impurities.

In some implementations, the FISS 300 may include an auto sampling module. For example, the FISS 300 may include a dispenser unit for temporarily storing pre-prepared sample collection container 335 including ferromagnetic impurities. For example, the dispenser unit may be configured in a vending machine-like format for a user to grab the pre-prepared sample containers instantly for immediate analysis.

FIG. 4A, FIG. 4B, FIG. 4C, FIG. 4D, and FIG. 4E depict a first embodiment of an exemplary inline battery material collector (IBMC). In this example, an IBMC 400 may be disposed next to a battery powder transportation chute (CPTC 405). The CPTC 405 may include a continuous flow of battery materials 415 (e.g., the BCM 110, cathode powder) in the battery production line 105.

Figure 4A:
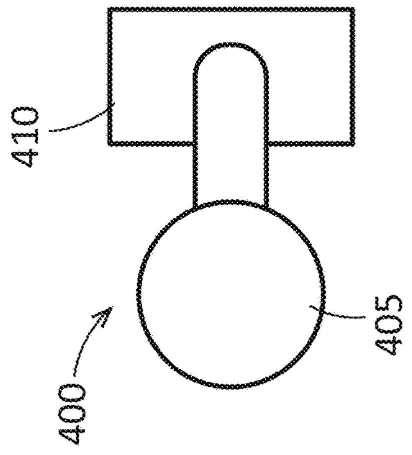
FIG. 4A, FIG. 4B, FIG. 4C, FIG. 4D, and FIG. 4E depict a first embodiment of an exemplary inline battery material collector (IBMC).
Figure 4B:
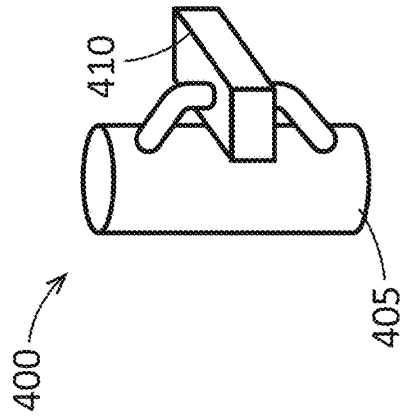
Figure 4C:
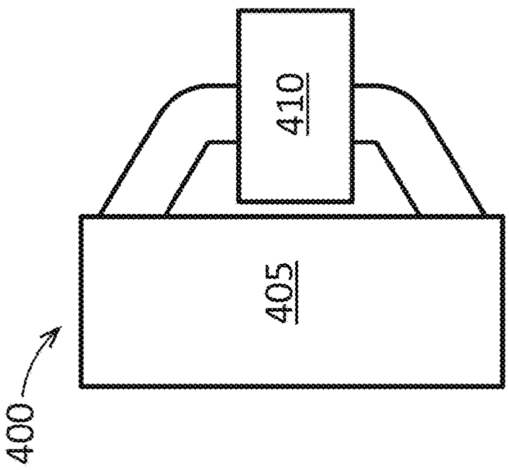
Figure 4D:
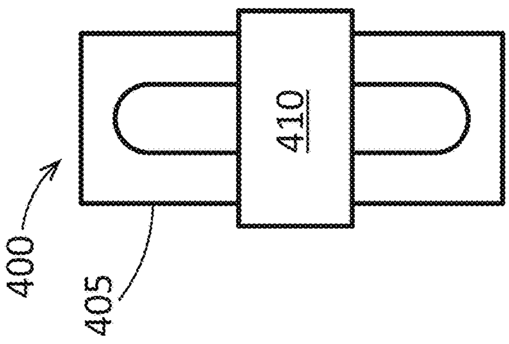
Figure 4E:
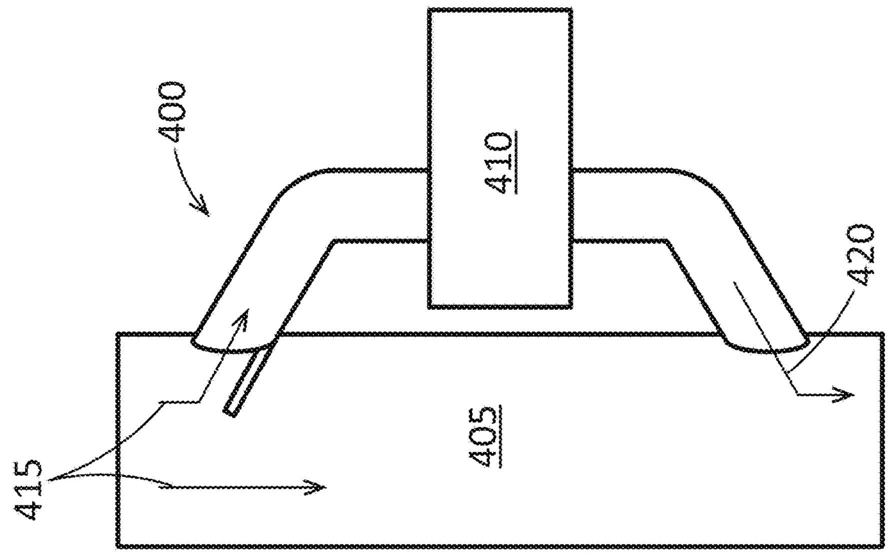

The IBMC 400 includes an impurities collector 410. For example, the impurities collector 410 may collect magnetic impurities with a magnetic setup. As shown in FIG. 4E, as the battery materials 415 is flowing through the CPTC 405, the impurities collector 410 may magnetically attract the magnetic impurities in the impurities collector 410 to be collected. In some implementations, the impurities collector 410 may include vibrating panels with electromagnets. In some implementations, the impurities collector 410 may include a mechanism to separate the battery materials 415 from magnetic impurities.

In some implementations, the impurities collector 410 may include an inline impurity separator (IIS). For example, the IIS may include a predetermined number (1, 2, 3, 5) of fixed magnetic strength electromagnets to generate a varying magnetic flux to separate magnetic impurities from a BCM. For example, after the magnetic impurities are collected by the IIS, the impurities collector 410 may transfer the collected magnetic impurities (e.g., to an aqueous solution) for voltammetry analysis testing (e.g., as described with reference to FIGS. 7A-B).

In this example, sampled particles from the battery materials 415 may be collected in the impurities collector 410 based on an activation signal of a magnetic force (e.g., via magnets stationed around and/or in the impurities collector 410). For example, the activation signal may be transmitted at a sampling time (e.g., periodically, manually). In some examples, after receiving a deactivation signal, the impurities collector 410 may turn off the magnetic force to release the sampled particles back into the CPTC 405 (as shown as returned particles 420). For example, the sampled particles may advantageously be collected without disrupting the flow of the CPTC 405. In some embodiments, the impurities collector 410 may include a sample analysis module. For example, the sample analysis module may include anodic stripping voltammetry. In some implementations, the impurities collector 410 may include the voltammetry analysis module 190 to perform voltammetry analysis.

Figure 5A:
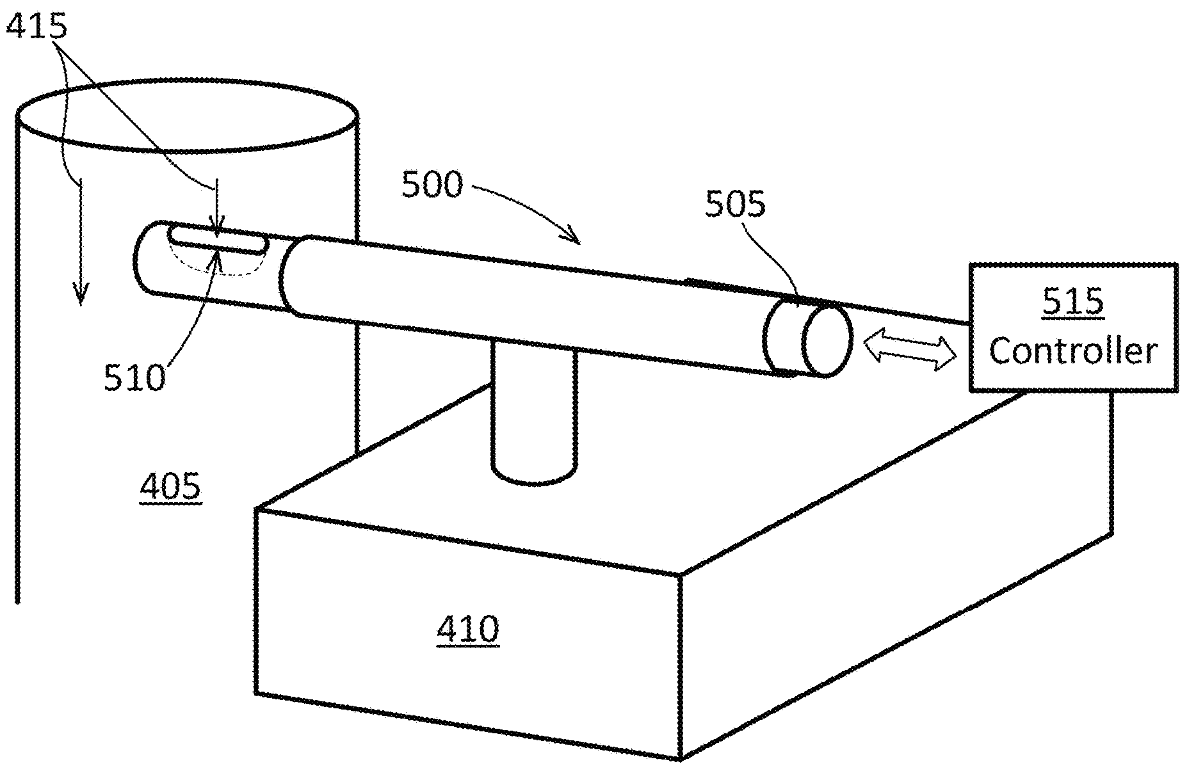
FIG. 5A and FIG. 5B depict a second embodiment of an exemplary IBMC.
Figure 5B:
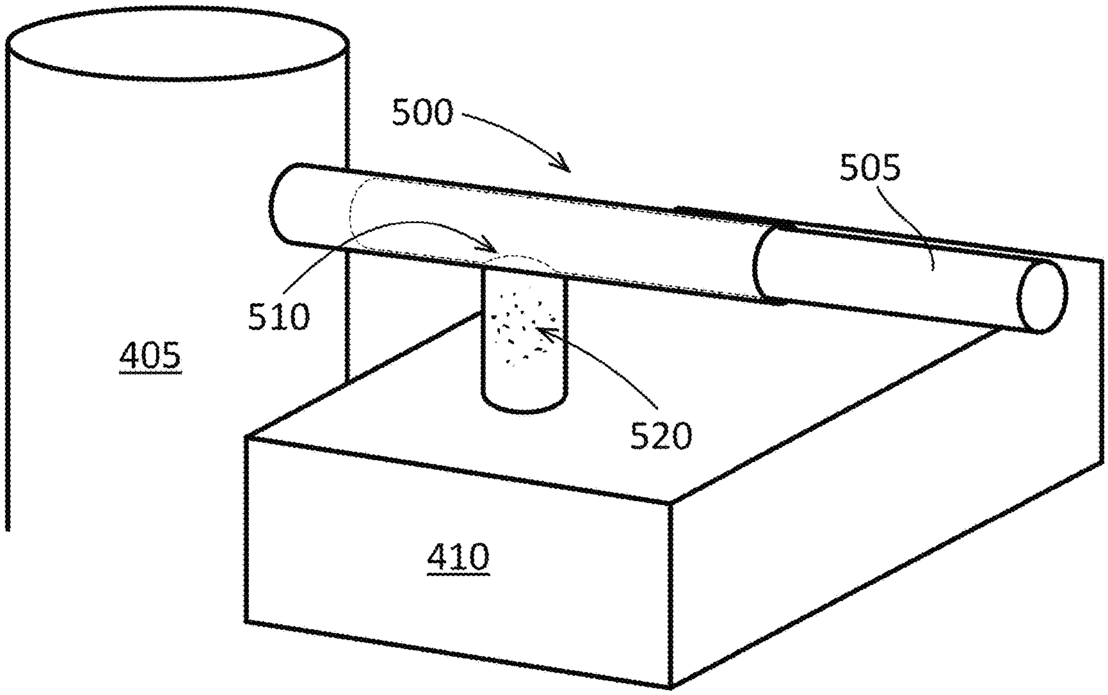

FIG. 5A and FIG. 5B depict a second embodiment of an exemplary IBMC. In this example, an IBMC 500 includes an intermittent sampling device 505. As shown in FIG. 5A, the intermittent sampling device 505 may collect the battery materials 415 from a continuous flow of battery material through an aperture 510.

A controller 515 is operably coupled to the intermittent sampling device 505. For example, the controller 515 may be an automated system. For example, the controller 515 may be an operator manually controlling the intermittent sampling device 505. In some implementations, the controller 515 may control the intermittent sampling device 505 to collect a sample 520 (FIG. 5B) of the battery materials 415 by moving the intermittent sampling device 505. As shown in FIG. 5B, after the sample 520 is collected, the intermittent sampling device 505 may release the sample into the impurities collector 410 to be analyzed. For example, the sample 520 may be removed from the battery materials 415 without being released back into the CPTC 405 to advantageously prevent contamination of the battery materials 415

Figure 6:
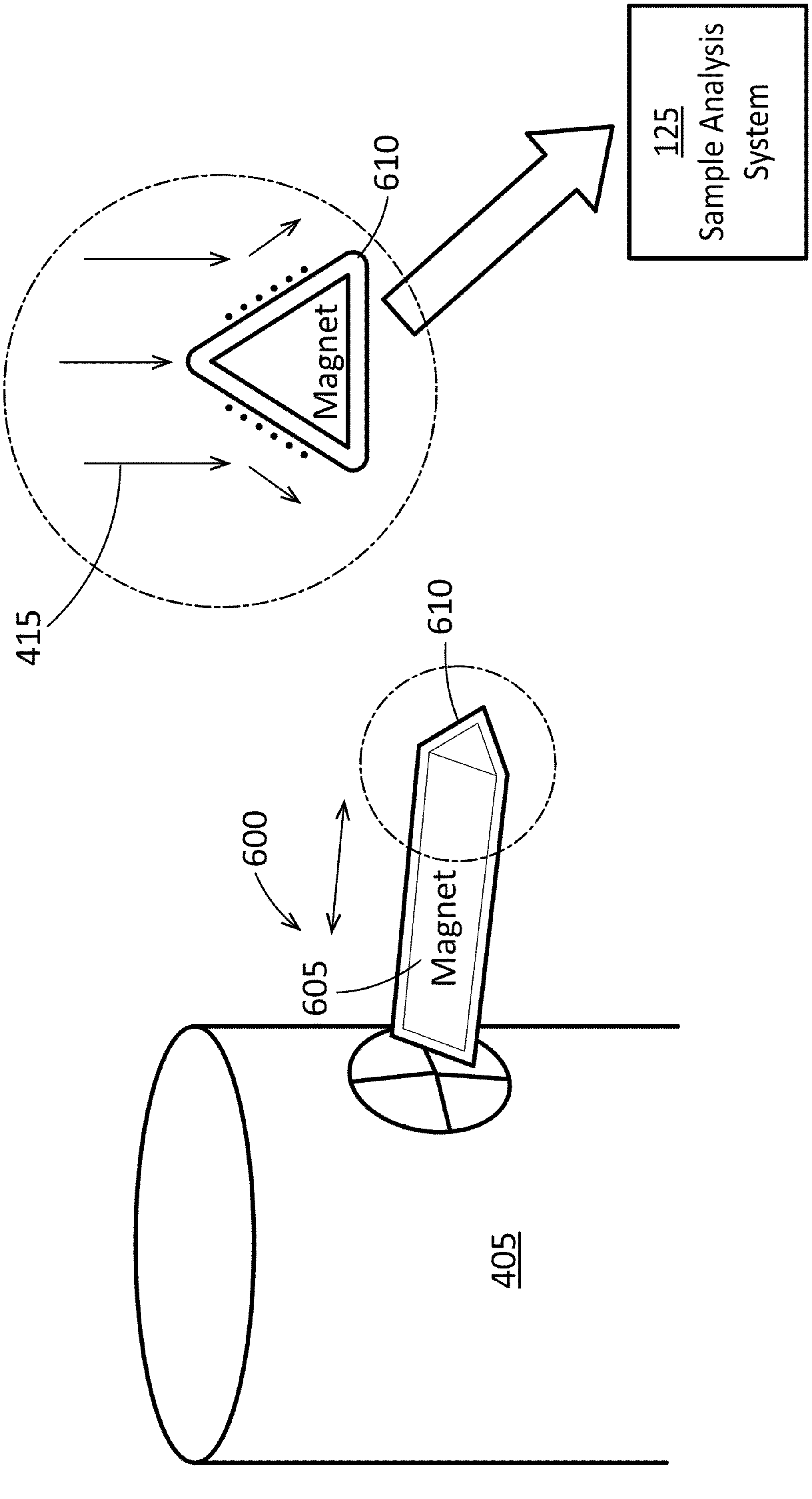
FIG. 6 depicts a third embodiment of an exemplary IBMC.

FIG. 6 depicts a third embodiment of an exemplary IBMC. For example, an IBMC 600 may directly extract magnetic impurities from the CPTC 405. As shown, the IBMC 600 includes a magnet 605 and a magnet sleeve 610. In operation, an operator may insert the IBMC 600 into the CPTC 405 when the battery materials 415 are flowing. For example, magnetic impurities may be collected onto the magnet sleeve 610 to be analyzed in, for example, the sample analysis system 125.

Figure 7A:
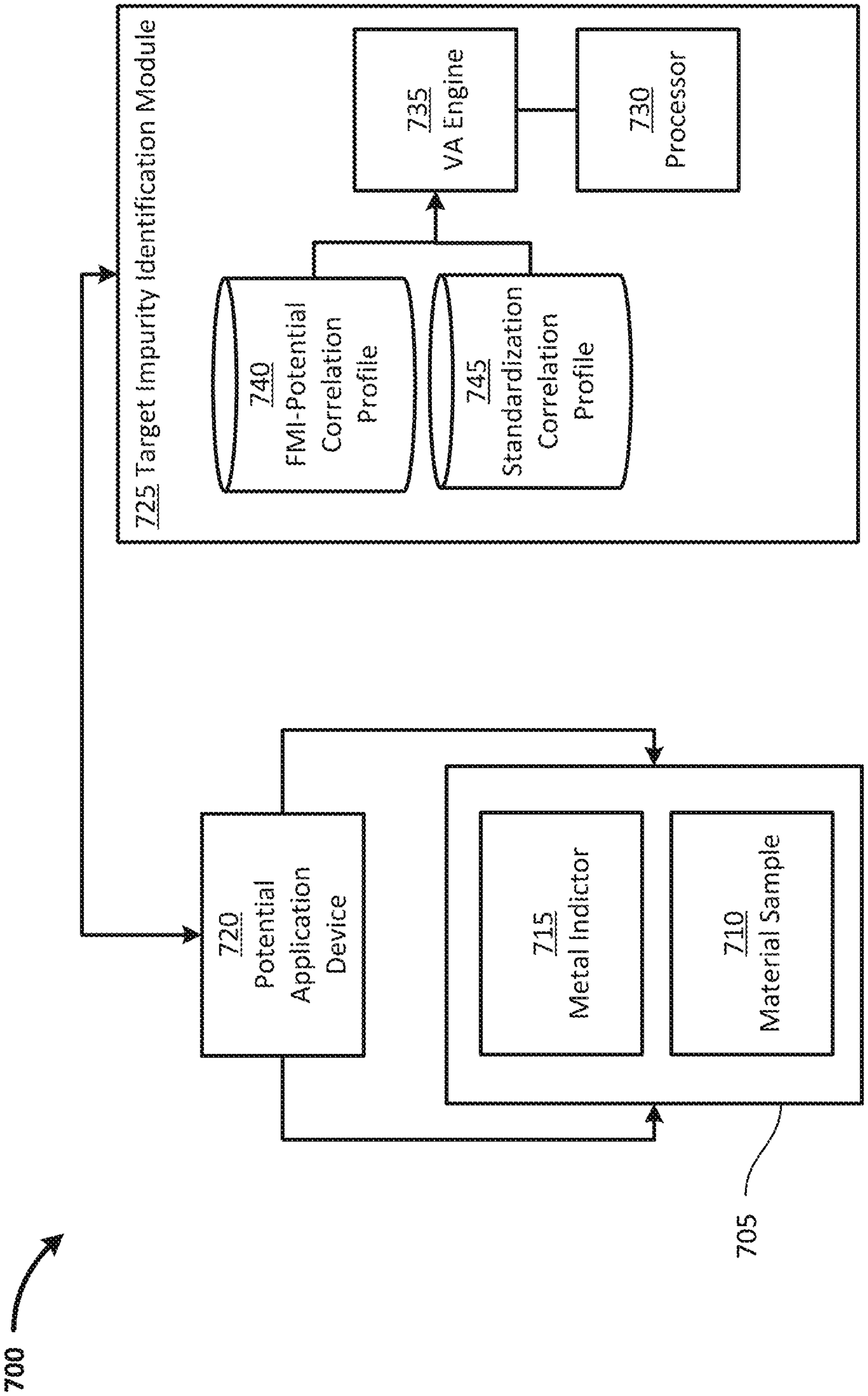
FIG. 7A is a block diagram depicting an exemplary voltammetry analysis module (VAM).

FIG. 7A is a block diagram depicting an exemplary voltammetry analysis module (VAM). In this example, the VAM 700 is analyzing a sample mixture 705. For example, the sample mixture 705 may be a water suspended solution. The sample mixture 705 includes a material sample 710 and a metal indicator 715. For example, the metal indictor may include a metal chelating agent. For example, the metal indicator 715 may be added to the material sample 710 after the material sample 710 is sampled from the IBMC 120. For example, the metal indicator 715 may include Calcon (Color Index (C.I.) 15705) metal indicator.

The VAM 700 also includes a potential application device 720. For example, the potential application device 720 may apply a range of potential across the sample mixture 705 in the voltammetry analysis. The potential application device 720 is coupled to a target impurity identification module (TIIM 725) in this example. The TIIM 725 may control a potential applied to the sample mixture 705. Also, the TIIM 725 may receive a response (e.g., a current response) from the sample mixture 705 at each of the applied potential.

The TIIM 725 includes a processor 730 coupled to a VA engine 735. For example, the VA engine 735 may be stored in a storage module containing programmable instructions for performing the voltammetry analysis. For example, the VA engine 735 may determine a range of potential to be applied to the sample mixture 705 based on a type of the material sample 710 and the metal indicator 715. For example, the VA engine 735 may generate an impurity metric representing a level of impurities in the material sample 710.

As shown, the VA engine 735 retrieves an FMI (ferromagnetic impurity)-potential correlation profile (FPCP 740) and a standardization correlation profile 745. For example, the VA engine 735 may generate an estimated impurity ratio of a bulk battery material (e.g., the BCM 110) as a function of the impurity metric, the FPCP 740, and the standardization correlation profile 745.

The FPCP 740, for example, may include a normal calibration curve between various response values from the potential application device 720 and known concentration of known impurities (e.g., calibration-use bulk materials). For example, the FPCP 740 may be generated by testing various known amounts of standard materials (e.g., as the material sample 710) with the VAM 700. For example, the FPCP 740 may represent a relationship between a signal size received from the potential application device 720 and actual amount of impurities in the material sample 710.

The standardization correlation profile 745, for example, may include a relationship between impurities collected in the material sample 710 (e.g., via the IBMC 120, the IBMC 400, the IBMC 500, and/or the IBMC 600) and actual impurity amount in battery material (e.g., the battery materials 415). For example, the IBMC 120 may collect 3-10% of actual magnetic impurities in a flow of BCM 110. For example, when the actual reading of magnetic impurities is 100 ppb (part-per-billion) in the BCM 110, the IBMC 120 may detect 5 ppb from the material sample 710 collected inline form the BCM 110. For example, as an illustrative example, the standardization correlation profile 745 may include a multiplication factor to ratio up 5 ppb to 100 ppb to generate an actual reading representing a metric for a bulk material corresponding to the material sample 710.

Figure 7B:
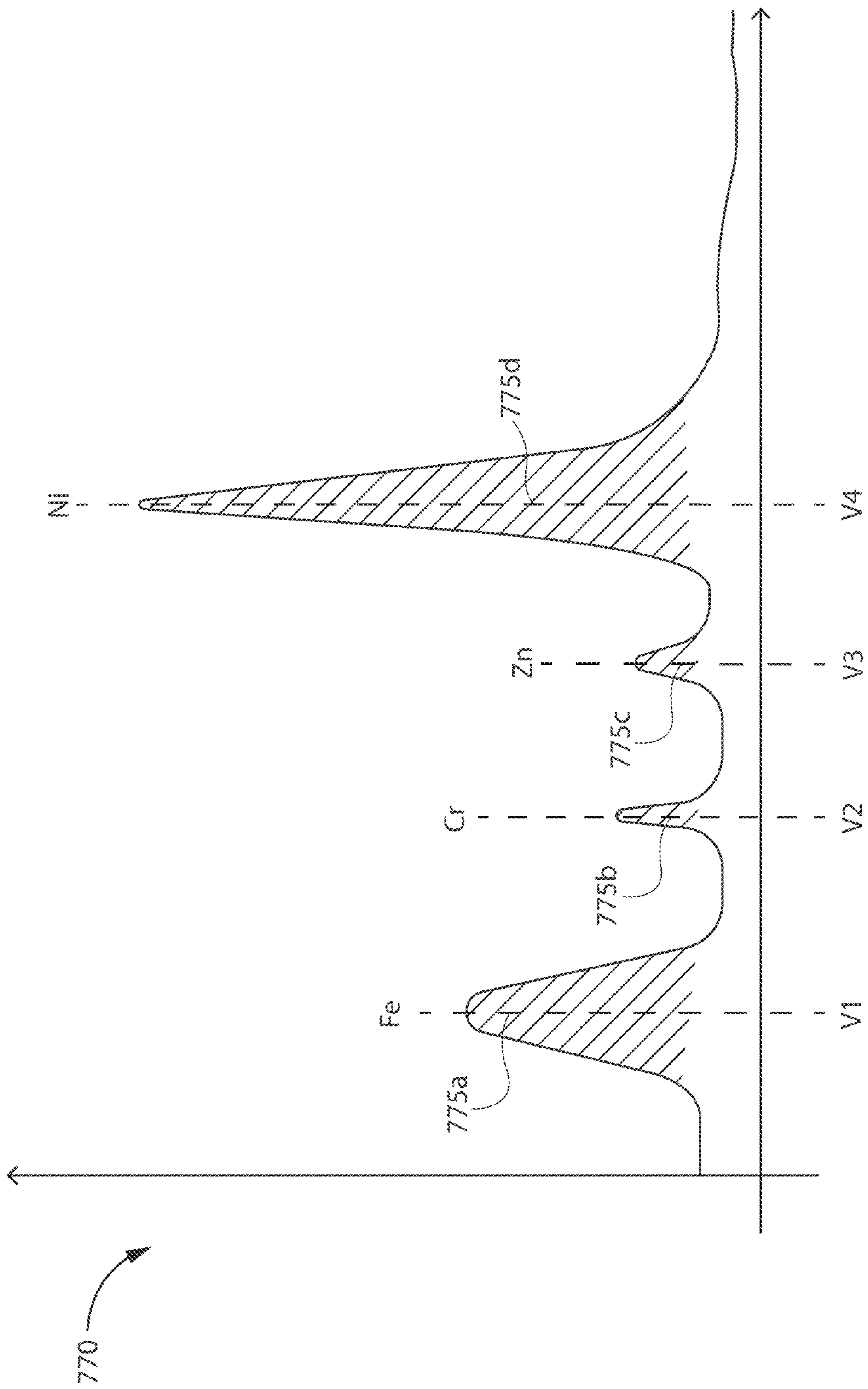
FIG. 7B shows an exemplary response diagram of a potential sweep and responses from an exemplary sample solution including iron, chromium, zinc, and nickel.

FIG. 7B shows an exemplary response diagram of a potential sweep and responses from an exemplary sample solution including iron, chromium, zinc, and nickel. In this example, a response diagram 770 includes a range of potential (V) applied to the material sample 710, and corresponding current response (A). In this example, the response diagram 770 includes peaks representing separation potentials for various elements in the VAM 700. For example, iron (Fe) may include a separation potential at V1. For example, chromium (Cr) may include a separation potential at V2. For example, Zinc (Zn) may include a separation potential at V3. For example, Nickel (Ni) may include a separation potential at V4.

In some implementations, based on the FPCP 740, the VA engine 735 may identify the peaks (V1-4) corresponding to each of target impurities (Fe, Cr, Zn, Ni). For example, the VA engine 735 may integrate an area under each of the peaks (V1-4), indicated by areas 775*a-d*, respectively, to generate a response value. In some implementations, the VA engine 735 may generate a sample metric representing a concentration of impurities in the material sample 710 based on the response value. For example, the VA engine 735 may further generate an actual concentration of a bulk material corresponding to the material sample 710 of the response diagram 770 as a function of the sample metric and the standardization correlation profile 745.

Figure 8:
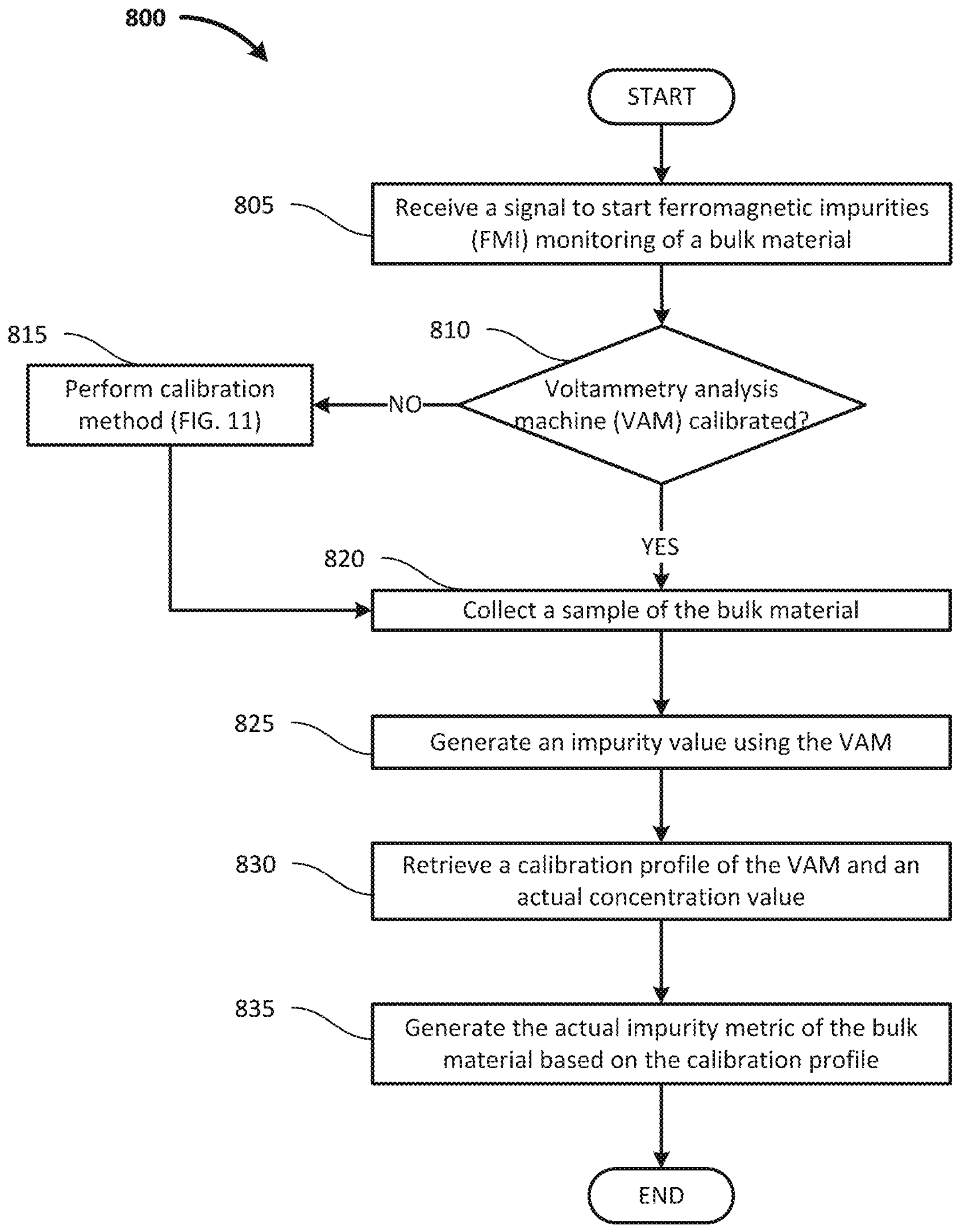
FIG. 8 is a flowchart illustrating an exemplary inline ferromagnetic impurity monitoring method.

FIG. 8 is a flowchart illustrating an exemplary inline ferromagnetic impurity monitoring method 800. For example, the exemplary inline ferromagnetic impurity monitoring method 800 may be performed by the BPS 100 using the IBMC 120, the sample analysis system 125, and/or the FISS 115. In this example, the exemplary inline ferromagnetic impurity monitoring method 800 begins when a signal to start ferromagnetic impurities (FMI) monitoring of a bulk material is received in step 805. For example, the controller 515 may receive a signal to collect a sample from the battery materials 415 to monitor ferromagnetic impurities.

Next, in a decision point 810, it is determined whether a VAM is calibrated with an actual impurity analysis. For example, the VA engine 735 may check whether the FPCP 740 and the standardization correlation profile 745 is valid. If the VAM is not calibrated, in step 815, a calibration method (e.g., as described in FIG. 11) of the VAM is performed. After the step 815 or if the VAM is calibrated, a sample of the bulk material is collected in step 820. For example, the BCM sample 110*b* may be collected by the IBMC 120. For example, the BPS 100 may use the IBMC 400, the IBMC 500, and/or the VAM 700 to collect the sample of the battery materials 415.

After the sample is collected, in step 825, an impurity value is generated using a voltammetry analysis machine. For example, the VAM 700 may be used to generate a sample metric representing concentrations of one or more target impurities using the FPCP 740. In step 830, a calibration profile of the VAM and an actual concentration value is retrieved. For example, the standardization correlation profile 745 is retrieved by the VA engine 735. In step 835, an actual impurity metric of the bulk material is generated based on the calibration profile, and the exemplary inline ferromagnetic impurity monitoring method 800 ends. For example, VA engine 735 may generate an actual ratio of ferromagnetic impurities of the BCM 110 based on the standardization correlation profile 745 and a generated sample metric.

Figure 9:
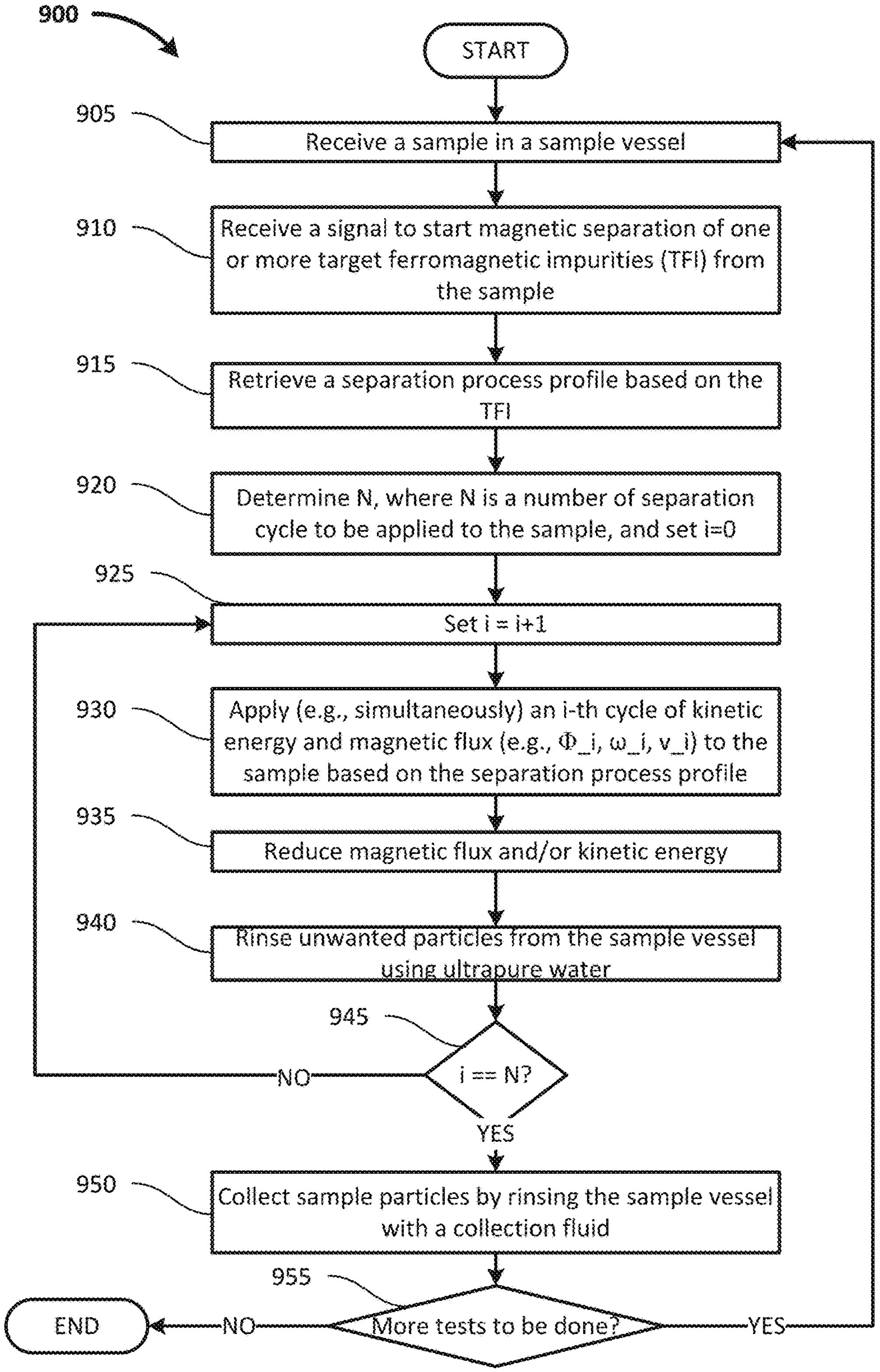
FIG. 9 is a flowchart illustrating an exemplary ferromagnetic impurity separation method.

FIG. 9 is a flowchart illustrating an exemplary ferromagnetic impurity separation method 900. For example, the FISC 135 may perform the exemplary ferromagnetic impurity separation method 900 to separate ferromagnetic impurities from other particles in the BCM 110.

In this example, the exemplary ferromagnetic impurity separation method 900 begins in step 905 when a sample is received in a sample vessel. For example, the FISC 135 may receive a signal when the sample vessel 130 is inserted into the FISS 115. Next, a signal is received to start magnetic separation of one or more target ferromagnetic impurities (TFI) in step 910. For example, the signal may be received at the user interface 215. A separation process profile, in step 915, is retrieved based on the TFI. For example, the process control engine 230 may retrieve the separation process profile 260.

In step 920, N is determined, where N is a number of separation cycles to be applied to the sample, and i=0 is set. For example, the process control engine 230 may determine N based on the separation process profile 260 and the TFI. Next, i is set to i+1 in step 925. In step 930, an i-th cycle of kinetic energy and magnetic flux (Φ_i, ω_i, v_i) is applied to the sample. For, the i-th cycle of kinetic energy and magnetic flux (Φ_i, ω_i, v_i) may also be time-varying within the i-th cycle. For example, the i-th cycle of kinetic energy and magnetic flux (Φ_i, ω_i, v_i) may be specified in the magnetic flux application profile 265 and the agitation application profile 270.

After the application of the i-th cycle of kinetic energy and magnetic flux (Φ_i, ω_i, v_i), magnetic flux and/or kinetic energy is/are reduced in step 935. Next, unwanted particles are rinsed from the sample vessel using ultrapure water in step 940. For example, the rinsing module 155 may rinse paramagnetic impurities the sample vessel 130 at each rinsing cycle.

In step 945, it is determined whether i is equal to N. For example, if N cycle is not reached, i is not equal to N and the step 925 is repeated. If i==N, in step 950, sample particles are collected by rinsing the sample vessel with a collection fluid. For example, the sample collecting module 140 may collect ferromagnetic impurities separated at the sample vessel 130 using an acid.

In a decision point 955, it is determined whether more tests are to be done. For example, the BPS 100 may include a standard to test a predetermined amount of sample per ton. For example, the BPS 100 may be required to test 300 g samples twenty times per a metric ton to advantageously generate a result with a predetermined certainty of confidence. If more tests need to be done, the step 905 is repeated. If no more tests are needed, the exemplary ferromagnetic impurity separation method 900 ends.

Figure 10:
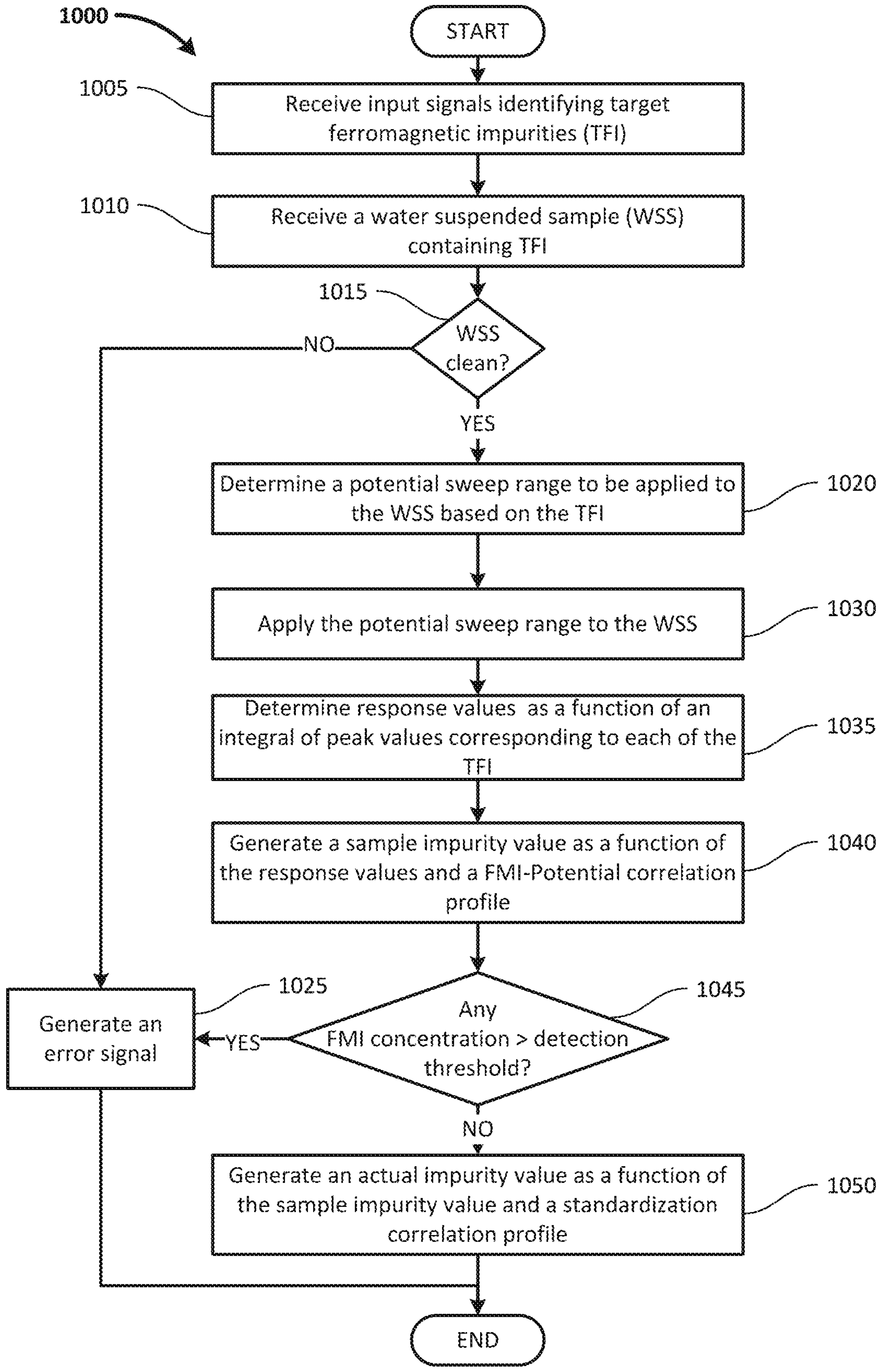
FIG. 10 is a flowchart illustrating an exemplary inline voltammetry analysis method.

FIG. 10 is a flowchart illustrating an exemplary inline voltammetry analysis method 1000. For example, the VA engine 735 may perform the exemplary inline voltammetry analysis method 1000 to generate a metric value representing ferromagnetic impurities in a bulk material (e.g., the BCM 110). In this example, in step 1005, the exemplary inline voltammetry analysis method 1000 begins when input signals identifying TFI are received. Next, in step 1010, a water suspended sample (WSS) containing TFI is received. For example, the sample mixture 705 is received.

In a decision point 1015, it is determined whether the WSS is clean. For example, the VAM 700 may check whether the sample mixture 705 contains no more than 2 ppm total dissolved solids. If the WSS is determined to be clean, in step 1020, a potential sweep range is determined to be applied to the WSS based on the TFI. For example, the VA engine 735 may determine the potential sweep range (e.g., V in the response diagram 770) based on user specified TFI. If the WSS is determined to be not clean an error signal is generated in step 1025, and the exemplary inline voltammetry analysis method 1000 ends.

In step 1030, after the potential sweep range is determined, the potential sweep range is applied to the WSS. For example, the VA engine 735 may control the potential application device 720 to apply the determined potentials to the sample mixture 705. Next, response values are determined as a function of an integral of peak values corresponding to each of the TFI in step 1035. For example, the integral values 775*a-d* are generated.

In step 1040, a sample impurity value is generated as a function of the response values and an FMI-potential correlation profile. For example, the VA engine 735 may generate the sample metric based on the integral values 775*a-d* and the FPCP 740. In a decision point 1045, it is determined whether any detected FMI concentration is larger than a predetermined detection threshold. For example, the VAM 700 may be configured to detect impurity concentrations down to 10 part-per-trillion (ppt) level if any magnetic impurity is present. For example, the predetermined detection threshold may be 200 ppb. If the detected FMI concentration is above the predetermined detection threshold, the step 1025 is repeated. If the detected FMI concentration is not above the predetermined detection threshold, an actual impurity value is generated as a function of the sample impurity value and a standardization correlation profile in step 1050, and the exemplary inline voltammetry analysis method 1000 ends. For example, the VA engine 735 may generate the actual metric based on the sample metric and the standardization correlation profile 745.

In some implementations, the VAM 700 may be configured that an overall value of magnetic impurities may be less than 50 ppb. For example, when the sample mixture 705 includes impurities over 50 ppb, bulk material of the sample mixture 705 may be contaminated. For example, the VA engine 735 may inform a user immediately.

Figure 11:
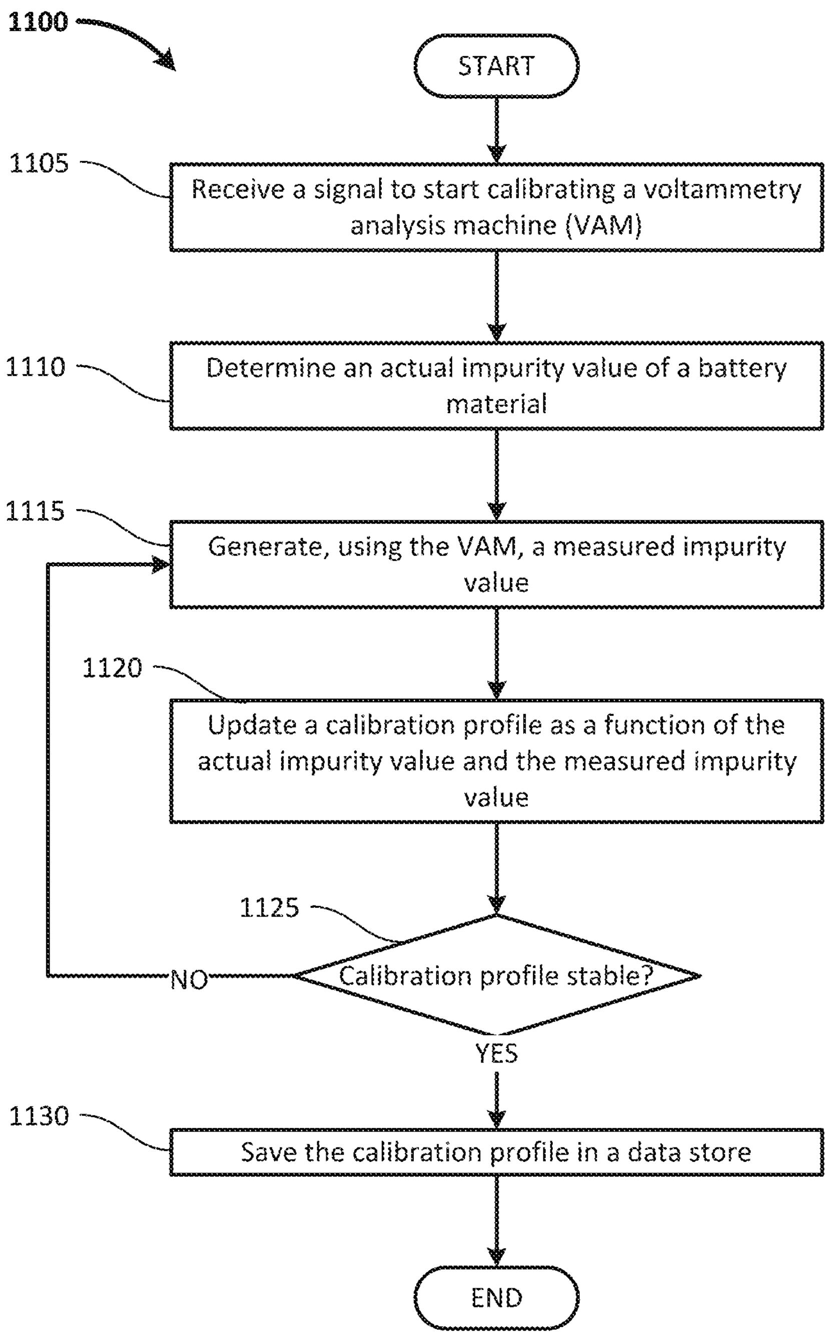
FIG. 11 is a flowchart illustrating an exemplary voltammetry analysis calibration method.

FIG. 11 is a flowchart illustrating an exemplary voltammetry analysis calibration method 1100. For example, the VA engine 735 may perform the exemplary voltammetry analysis calibration method 1100 to generate the standardization correlation profile 745. In this example, the exemplary voltammetry analysis calibration method 1100 begins when a signal is received to start calibrating a VAM in step 1105. Next, in step 1110, an actual impurity value of a battery material is determined. For example, the VA engine 735 may determine the actual impurity value based on a standardized material used in a calibration process.

A measured impurity value is generated using the VAM in step 1115. For example, the VA engine 735 may operate the potential application device 720 to obtain the measured impurity value. For example, the measured impurity value may be generated as a function of the FPCP 740. In step 1120, a calibration profile is updated as a function of the actual impurity value and the measured impurity value. For example, the VA engine 735 may update the standardization correlation profile 745 using a ratio between the actual impurity value and the measured impurity value.

In a decision point 1125, it is determined whether the calibration profile is stable. For example, the VA engine 735 may perform tests to determine whether the standardization correlation profile 745 is stable based on an error between a generated impurity value using the standardization correlation profile 745 and the actual impurity value. If the calibration profile is not stable, the step 1115 is repeated. If the calibration profile is stable, in step 1130, the calibration profile is saved in a data store, and the exemplary voltammetry analysis calibration method 1100 ends.

Although various embodiments have been described with reference to the figures, other embodiments are possible. In some implementations, the rinsing module 155 may include a mechanical brushing unit (MBU) to mechanically remove unwanted particles from the sample vessel 130. For example, the MBU may include a boom to brush the unwanted particles from the wall of the sample vessel 130 at the rinsing cycle. For example, the MBU may include an air blower to use wind to remove unwanted particles from the sample vessel 130.

Although an exemplary system has been described with reference to FIGS. 1-7B, other implementations may be deployed in other industrial, scientific, medical, commercial, and/or residential applications.

In an illustrative example, a method to isolate magnetic impurities of a sample may include weighing and depositing the sample into a container. In a second step, the container may be sealed with a lid and inserted with a magnetic impurity separating machine. In a third step, the lid of the container may be coupled to the machine. In a fourth step, the sample is spun at a high rate of speed with high magnetic strength. This may, for example, separate all the magnetic impurities from the bulk sample. The machine may, for example, frequently vary from high to low speed while in spinning cycles. The electromagnetic sleeve may, for example, pulsate at different harmonization to fully extract particulates. The device may, for example, release kinetic energy in two axes, maximizing the extraction potential of the sample. In a fifth step, the machine performs a rinse cycle. The rinse cycle may occur over a long period of time. The rinse cycle may, for example, be spun at a low rate of speed through a medium magnetic strength field. This may, for example, separate all unwanted impurities. This step may, for example, remove unwanted impurities that may exist from the bulk powder sample. This step, may, for example, be repeated multiple times to ensure quality of rinsing. The electromagnets may, for example, be set to vary proprietary levels for efficient rinsing.

In a sixth step, the rinse cycle may, for example, be performed over a short period of time. The rinse cycle may, for example, occur at a low magnetic strength. The rinse cycle may, for example, occur at a medium rate of speed. The step may, for example, remove all unwanted impurities. This step may, for example, remove unwanted impurities that may exist in the sample container. This step may, for example, be repeated multiple times to ensure quality of rinsing. The electromagnets may, for example, be set to vary proprietary levels for efficient rinsing.

Between steps four, five, and six a seventh step, referred to as a dumping step, may, for example, be performed by the machine to release waste or samples from the container depending on the step. This may, for example, allow for acquiring the material with minimal contamination.

In an eight step, a user turns the setting of the machine to have no magnetic strength. A user then collects all of the cleaned magnetic impurities. The solution may, for example, be adjusted with optical (SEM), spectroscopic (XRF, XRD), or elemental (ICP) analysis. The sample will be collected into a 50 mL sterile test tube by the user.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a ferromagnetic impurity separation system may include a sample vessel configured to enclose a sample of bulk battery materials. For example, the ferromagnetic impurity separation system may include a variable magnetic flux generator disposed at a position separated from the sample vessel. For example, the variable magnetic flux generator may be configured to generate a variable magnetic flux at the sample vessel.

For example, the ferromagnetic impurity separation system may include an agitation unit coupled to the sample vessel. For example, the agitation unit may include a rotational motor configured to rotate the sample vessel about a central axis. For example, the agitation unit may include a translational motor configured to translate the sample vessel. For example, the sample vessel may be displaced in a Euclidean space.

For example, in an operation mode, the variable magnetic flux generator and the agitation unit may operate in a first separation cycle. For example, the variable magnetic flux generator and the agitation unit may apply a first predetermined magnetic flux ($\Phi_1$), a first predetermined angular velocity ($\omega_1$) and a first predetermined velocity ($v_1$) to the sample vessel. For example, ferromagnetic impurities may be separated from the sample.

For example, the first separation cycle may include apply a first rinsing magnetic flux ($\Phi_{r1}$) to the sample vessel. For example, $\Phi_{r1}<\Phi_1$. For example, the first separation cycle may include rinse the sample vessel with ultrapure water.

For example, the operation mode may include N separation cycles. For example, in each i-th cycle, where i may be an integer and $1\leq i\leq N$, the variable magnetic flux generator and the agitation unit may apply an i-th predetermined magnetic flux ($\Phi_i$), an i-th predetermined angular velocity ($\omega_i$) and an i-th predetermined velocity ($v_i$) to the sample vessel. For example, the variable magnetic flux generator may apply an i-th rinsing magnetic flux ($\Phi_{ri}$) to the sample vessel. For example, $\Phi_{ri}<\Phi_i$. For example, the operation mode may include rinse the sample vessel with the ultrapure water.

For example, magnetic fluxes ($\Phi_1, \Phi_2, \ldots \Phi_N$) applied in subsequent cycles $i=1, 2, \ldots, N$ may be configured to be monotonically diminishing. For example, $\Phi_1>\Phi_2> \ldots >\Phi_N$. For example, paramagnetic impurities may present in the sample vessel may be separated from the ferromagnetic impurities in each of the subsequent cycles.

For example, the ferromagnetic impurity separation system may include a data store may include a magnetic flux application profile and an agitation application profile. For example, the ferromagnetic impurity separation system may include a controller operably coupled to the data store and may be configured to control the variable magnetic flux generator and the agitation unit. For example, in each cycle i, the controller may be configured to regulate the i-th predetermined magnetic flux ($\Phi_i$), the i-th predetermined angular velocity ($\omega_i$) and the i-th predetermined velocity ($v_i$) based on the magnetic flux application profile and the agitation application profile retrieved from the data store.

For example, the operation mode further may include collect the ferromagnetic impurities by rinsing the sample vessel with an acid. For example, the variable magnetic flux generator may include an electromagnet. For example, the variable magnetic flux generator further may include a permanent magnet.

For example, the variable magnetic flux generator may be configured to selectively supply a magnetic flux in a range of 1000 Gauss to 12000 Gauss. For example, the variable magnetic flux generator and the agitation unit simultaneously may apply the $\Phi_1$, the $\omega_1$, and the $v_1$ to the sample vessel.

In an illustrative aspect, an inline ferromagnetic impurity analysis system may include a data store including a program of instructions. For example, the inline ferromagnetic impurity analysis system may include a processor operably coupled to the data store. For example, when the processor executes the program of instructions, the processor may cause operations to be performed to automatically generate a ferromagnetic impurity concentration of a bulk battery material based on a sample of the bulk battery material collected within a production line for a battery.

For example, the operations may include receive a signal identifying a target impurity element to be detected in the sample. For example, the sample may include a solution of a chelating agent and a water suspended bulk battery material sampled from the production line. For example, the operations may include determine a range of potential to be applied to the sample based on the target impurity element. For example, the operations may include, during application of the range of potential, determine a response value from the sample corresponding to the target impurity element. For example, the response value may include an integral of a peak current response corresponding to the target impurity element.

For example, the operations may include generate a measured impurity concentration for each of the target impurity element as a function of the response value and a normal correlation profile. For example, the normal correlation profile may include a correlation between the response value and a concentration of the target impurity element in the sample. For example, the operations may include generate an actual concentration of impurity in the bulk battery material based on the measured impurity concentration and a standardization correlation profile. For example, the standardization correlation profile may include a correlation between the measured impurity concentration in the sample and an actual concentration in the bulk battery material. For example, the ferromagnetic impurity concentration of the bulk battery material may be monitored within the production line for the battery.

For example, the operations further may include determine the normal correlation profile by relating a known concentration of a standardized target impurity sample to the response value corresponding to the standardized target impurity sample.

For example, the operations further may include determine the standardization correlation profile by relating a more accurate measurement of the actual concentration of the target impurity element to a corresponding measured impurity concentration of the target impurity element using the operations.

For example, the operations further may include use a ferromagnetic impurity separation system to perform separation operations to generate the more accurate measurement of actual concentration of the target impurity element. For example, the separation operations may include enclose a sample of a calibration-use bulk battery material in a sample vessel. For example, the separation operations may include apply N cycles of separation process to the sample vessel, where $N\geq 1$ and. For example, in each i-th cycle of separation process, where $1\leq i\leq N$, the separation process may include determine a magnetic flux ($\Phi_i$), an i-th predetermined angular velocity ($\omega_i$) and an i-th predetermined velocity ($v_i$) to be applied to the sample vessel. For example, the separation process may include apply the $\Phi_i$, the $\omega_i$, and the $v_i$ to the sample vessel. For example, the magnetic fluxes ($\Phi_1$, $\Phi_2$, . . . $\Phi_N$) applied in subsequent cycles i=1, 2, . . . , N may be configured to be monotonically diminishing. For example, $\Phi\_1>\Phi\_2> . . . >\Phi\_N$. the separation process may include rinse the sample vessel to collect particles with a collection fluid. For example, the ferromagnetic impurity may be separated from the calibration-use bulk battery material without contaminations. For example, a range of the $\Phi_i$ may be between 1000 Gauss and 12000 Gauss.

In an illustrative aspect, a ferromagnetic impurity separation method may include receive a sample of bulk battery material enclosed in a sample vessel. For example, the ferromagnetic impurity separation method may include begin a separation process including N separation cycle. For example, in each i-th cycle, where i may be an integer and $1\leq i\leq N$, the separation process may include may apply a predetermined angular velocity ($\omega_i$), a predetermined velocity ($v_i$), and a predetermined magnetic flux ($\Phi_i$) to the sample vessel (930). For example, the predetermined magnetic fluxes ($\Phi_1$, $\Phi_2$, . . . $\Phi_N$) applied in subsequent cycles i=1, 2, . . . , N may be configured to be monotonically diminishing. For example, $\Phi\_1>\Phi\_2> . . . >\Phi\_N$. For example, the ferromagnetic impurity separation method may include rinse the sample vessel to collect particles with a collection fluid. For example, ferromagnetic impurities may be separated from the sample of bulk battery material including paramagnetic impurities.

For example, the predetermined angular velocity and the predetermined velocity of each separation cycle may be configured. For example, a kinetic energy ($KE_1$, $KE_2$, . . . $KE_N$) corresponding to the predetermined angular velocity and the predetermined velocity of each separation cycle i=1, 2, . . . , N may be configured to be monotonically diminishing.

For example, for each of the i-th separation cycle, the method further may include apply a rinsing magnetic flux ($\Phi\_i1$) to the sample vessel. For example, $\Phi\_i1<\Phi\_i$. For example, for each of the i-th separation cycle, the method further may include rinse the sample vessel with ultrapure water. For example, the paramagnetic impurities in the sample may be dumped out of the sample vessel.

For example, the collection fluid may include an acid. For example, the method further may include analyze the collected particles using an Inductively Coupled Plasma (ICP) analysis. For example, a range of the $\Phi_i$ may be between 1000 Gauss and 12000 Gauss.

For example, the ferromagnetic impurity separation system of any of [0120-28] may be combined in combination with any of the inline ferromagnetic impurity analysis system of [0129-0134]. For example, the ferromagnetic impurity separation system of any of [0120-28] may be combined in combination with any of the ferromagnetic impurity separation method of [0135-38].

For example, the inline ferromagnetic impurity analysis system of any of [0129-0134] may be combined in combination with any of the ferromagnetic impurity separation system of [0120-28]. For example, the inline ferromagnetic impurity analysis system of any of [0129-0134] may be combined in combination with any of the ferromagnetic impurity separation method of [0135-38].

For example, the ferromagnetic impurity separation method of any of [0135-38] may be combined in combination with any of the ferromagnetic impurity separation system of [0120-28]. For example, the ferromagnetic impurity separation method of any of [0135-38] may be combined in combination with any of the inline ferromagnetic impurity analysis system of [0129-0134].

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A ferromagnetic impurity separation system comprising:

a sample vessel configured to enclose a sample of bulk battery materials;

a variable magnetic flux generator disposed at a position separated from the sample vessel, wherein the variable magnetic flux generator is configured to generate a variable magnetic flux at the sample vessel;

an agitation unit coupled to the sample vessel, wherein the agitation unit comprises:

a rotational motor configured to rotate the sample vessel about a central axis; and, a translational motor configured to translate the sample vessel, such that the sample vessel is displaced in a Euclidean space, wherein, in an operation mode, the variable magnetic flux generator and the agitation unit operate in a first separation cycle, wherein the variable magnetic flux generator and the agitation unit apply a first predetermined magnetic flux ($\Phi_1$), a first predetermined angular velocity ($\omega_1$) and a first predetermined velocity ($v_1$) to the sample vessel, such that ferromagnetic impurities are separated from the sample.

2. The ferromagnetic impurity separation system of claim 1, wherein the first separation cycle further comprise:

apply a first rinsing magnetic flux ($\Phi_{r1}$) to the sample vessel, wherein $\Phi_{r1}<\Phi_1$; and, rinse the sample vessel with ultrapure water.

3. The ferromagnetic impurity separation system of claim 2, wherein the operation mode comprises N separation cycles, wherein, in each i-th cycle, where i is an integer and $1\leq i\leq N$, the variable magnetic flux generator and the agitation unit apply an i-th predetermined magnetic flux ($\Phi_i$), an i-th predetermined angular velocity ($\omega_i$) and an i-th predetermined velocity ($v_i$) to the sample vessel;

the variable magnetic flux generator applies an i-th rinsing magnetic flux ($\Phi_{ri}$) to the sample vessel, wherein $\Phi_{ri}<\Phi_i$; and, rinse the sample vessel with the ultrapure water.

4. The ferromagnetic impurity separation system of claim 3, wherein magnetic fluxes ($\Phi_1, \Phi_2, \ldots \Phi_N$) applied in subsequent cycles i=1, 2, . . . , N are configured to be monotonically diminishing, such that $\Phi_1>\Phi_2> \ldots >\Phi_N$, such that paramagnetic impurities present in the sample vessel are separated from the ferromagnetic impurities in each of the subsequent cycles.

5. The ferromagnetic impurity separation system of claim 3, further comprises:

a data store comprising a magnetic flux application profile and an agitation application profile; and, a controller operably coupled to the data store and is configured to control the variable magnetic flux generator and the agitation unit, wherein, in each cycle i, the controller is configured to regulate the i-th predetermined magnetic flux ($\Phi_i$), the i-th predetermined angular velocity ($\omega_i$) and the i-th predetermined velocity ($v_i$) based on the magnetic flux application profile and the agitation application profile retrieved from the data store.

6. The ferromagnetic impurity separation system of claim 2, wherein the operation mode further comprises collect the ferromagnetic impurities by rinsing the sample vessel with an acid.

7. The ferromagnetic impurity separation system of claim 1, wherein the variable magnetic flux generator comprises an electromagnet.

8. The ferromagnetic impurity separation system of claim 7, wherein the variable magnetic flux generator further comprises a permanent magnet.

9. The ferromagnetic impurity separation system of claim 1, wherein the variable magnetic flux generator is configured to selectively supply a magnetic flux in a range of 1000 Gauss to 12000 Gauss.

10. The ferromagnetic impurity separation system of claim 1, wherein the variable magnetic flux generator and the agitation unit simultaneously apply the $\Phi_1$, the $\omega_1$, and the $v_1$ to the sample vessel.

11. The system of claim 1, further configured to:

dispense an acid solution source into the sample vessel; and dispense an ultrapure water source into the sample vessel, wherein a resulting mixture in the sample vessel comprises a water suspended solution.

12. The system of claim 1, wherein:

the bulk battery materials comprise the ferromagnetic impurities and paramagnetic impurities, and the variable magnetic flux generator and the agitation unit simultaneously and controllably apply the first predetermined magnetic flux, the first predetermined angular velocity, and the first predetermined velocity to the sample vessel.

13. The system of claim 12, wherein the paramagnetic impurities are separated from the bulk battery materials, the ferromagnetic impurities are separated from the bulk battery materials, and the ferromagnetic impurities are separated from the paramagnetic impurities.

14. The system of claim 12, wherein the ferromagnetic impurities and paramagnetic impurities are dissolved in fluid in the sample vessel during at least one of separation cycles.

15. The system of claim 1, wherein at least some of the predetermined magnetic fluxes are applied from outside the sample vessel.

16. The system of claim 1, wherein the bulk battery materials comprise precursor cathode materials.

17. A ferromagnetic impurity separation method comprising:

receiving a sample of bulk battery material enclosed in a sample vessel;

beginning a separation process comprising N separation cycle, wherein, in each i-th cycle, where i is an integer and $1\leq i\leq N$, the separation process comprises applying a predetermined angular velocity ($\omega_i$), a predetermined velocity ($v_i$), and a predetermined magnetic flux ($\Phi_i$) to the sample vessel, wherein the predetermined magnetic fluxes ($\Phi_1, \Phi_2, \ldots \Phi_N$) applied in subsequent cycles i=1, 2, . . . , N are configured to be monotonically diminishing, such that $\Phi_1>\Phi_2> \ldots >\Phi_N$; and, rinsing the sample vessel to collect particles with a collection fluid, such that ferromagnetic impurities are separated from the sample of bulk battery material comprising paramagnetic impurities.

18. The ferromagnetic impurity separation method of claim 17, wherein the predetermined angular velocity and the predetermined velocity of each separation cycle is configured, such that a kinetic energy (KE_1, KE_2, . . . KE_N) corresponding to the predetermined angular velocity and the predetermined velocity of each separation cycle i=1, 2, . . . , N are configured to be monotonically diminishing.

19. The ferromagnetic impurity separation method of claim 17, wherein, for each of the i-th separation cycle, the method further comprises:

applying a rinsing magnetic flux ($\Phi$_i1) to the sample vessel, wherein $\Phi$_i1<$\Phi$_i; and, rinsing the sample vessel with ultrapure water, such that the paramagnetic impurities in the sample are dumped out of the sample vessel.

20. The ferromagnetic impurity separation method of claim 17, wherein the collection fluid comprises an acid, wherein the method further comprises analyzing the collected particles using an Inductively Coupled Plasma (ICP) analysis.

21. The ferromagnetic impurity separation method of claim 17, wherein a range of the $\Phi$_i is between 1000 Gauss and 12000 Gauss.

* * * * *